United States Patent
Yoon et al.

(10) Patent No.: US 12,242,880 B2
(45) Date of Patent: Mar. 4, 2025

(54) DISPLAY APPARATUS FOR VEHICLES

(71) Applicant: LG Electronics Inc., Seoul (KR)

(72) Inventors: Jaegu Yoon, Seoul (KR); Heemin Lee, Seoul (KR); Sunhee Lim, Seoul (KR); Daeyoung Jeong, Seoul (KR); Dongwoo Han, Seoul (KR); Dongkyu Lee, Seoul (KR); Dukyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/278,333

(22) PCT Filed: Aug. 13, 2021

(86) PCT No.: PCT/KR2021/010773
§ 371 (c)(1),
(2) Date: Aug. 22, 2023

(87) PCT Pub. No.: WO2022/181904
PCT Pub. Date: Sep. 1, 2022

(65) Prior Publication Data
US 2024/0168690 A1    May 23, 2024

(30) Foreign Application Priority Data
Feb. 26, 2021 (KR) .................. 10-2021-0026453
Apr. 23, 2021 (KR) .................. 10-2021-0053004

(51) Int. Cl.
*G06F 9/455* (2018.01)
*B60K 35/00* (2024.01)
(Continued)

(52) U.S. Cl.
CPC ........ *G06F 9/45558* (2013.01); *B60K 35/213* (2024.01); *B60K 35/22* (2024.01);
(Continued)

(58) Field of Classification Search
CPC .... G06F 9/45558; G06F 3/1423; G06F 9/544; G06F 2009/4557; G06F 2009/45579;
(Continued)

(56) References Cited

U.S. PATENT DOCUMENTS 10,430,216 B1 * 10/2019 Loughmiller ......... G06F 3/0644
11,656,894 B2 *  5/2023 Lee ...................... G06F 9/45533
                                                                     718/1
(Continued)

FOREIGN PATENT DOCUMENTS

JP          6523298        5/2019
JP       2020201761       12/2020
(Continued)

*Primary Examiner* — Grant Sitta
(74) *Attorney, Agent, or Firm* — Fish & Richardson P.C.

(57) ABSTRACT

A display apparatus for a vehicle includes: first, second, and third displays located in the vehicle, a first signal processing device comprising a first processor configured to perform signal processing for the first display and the second display, and a second signal processing device comprising a second processor configured to perform signal processing for the third display. The first processor is configured to execute first, second, and third virtual machines on a hypervisor in the first processor. The first virtual machine is configured to transmit, from at least one of the second virtual machine or the third virtual machine to the second signal processing device, a remote processing request, receive image data processed by the second signal processing device in response to the remote processing request, and control at least one of the first display or the second display to display an image related to the received image data.

20 Claims, 15 Drawing Sheets

(51) Int. Cl.
*B60K 35/21* (2024.01)
*B60K 35/22* (2024.01)
*B60K 35/29* (2024.01)
*B60R 16/023* (2006.01)
*G06F 3/14* (2006.01)
*G06F 9/54* (2006.01)

(52) U.S. Cl.
CPC ............ *B60K 35/29* (2024.01); *G06F 3/1423* (2013.01); *G06F 9/544* (2013.01); *B60K 35/00* (2013.01); *B60K 2360/18* (2024.01); *B60R 16/023* (2013.01); *G06F 2009/4557* (2013.01); *G06F 2009/45579* (2013.01); *G06F 2009/45583* (2013.01); *G06F 2009/45595* (2013.01)

(58) Field of Classification Search
CPC . G06F 2009/45583; G06F 2009/45595; B60K 35/213; B60K 35/22; B60K 35/29; B60K 35/00; B60K 2360/18; B60R 16/023
See application file for complete search history.

(56) References Cited

U.S. PATENT DOCUMENTS

| | | | | |
|---|---|---|---|---|
| 11,853,103 | B2* | 12/2023 | Kurita | G06F 11/1441 |
| 2011/0157193 | A1* | 6/2011 | Boucher | G06F 9/5083 |
| | | | | 345/1.3 |
| 2016/0328254 | A1* | 11/2016 | Ahmed | G06F 9/45545 |
| 2019/0294462 | A1* | 9/2019 | Franciosi | G06F 9/45533 |
| 2020/0326898 | A1* | 10/2020 | Mues | G06F 9/4555 |
| 2021/0264559 | A1* | 8/2021 | Roper | G06F 9/45558 |
| 2022/0365804 | A1* | 11/2022 | Delahais | G06F 9/541 |

FOREIGN PATENT DOCUMENTS

| | | |
|---|---|---|
| KR | 20010053431 | 6/2001 |
| KR | 20200110229 | 9/2020 |

\* cited by examiner

FIG. 12

DISPLAY APPARATUS FOR VEHICLES

CROSS-REFERENCE TO RELATED APPLICATIONS

This application is a National Stage application under 35 U.S.C. § 371 of International Application No. PCT/KR2021/010773, filed on Aug. 13, 2021, which claims the benefit of Korean Patent Application No. 10-2021-0026453, filed on Feb. 26, 2021, and Korean Patent Application No. 10-2021-0053004, filed on Apr. 23, 2021. The disclosures of the prior applications are incorporated by reference in their entirety.

TECHNICAL FIELD

The present disclosure relates to a display apparatus for vehicles, and more particularly, to a display apparatus for vehicles capable of displaying images divided and processed by a plurality of signal processing devices in a vehicle.

BACKGROUND

A vehicle is an apparatus that a driver moves in a desired direction. A representative example of the vehicle is a car.

In some implementations, a display apparatus for vehicles is located in the vehicle for convenience of users who use the vehicle.

For example, a display is disposed in a cluster in order to display various kinds of information. Bay way of further example, in order to display vehicle driving information, various displays, such as an audio video navigation (AVN) display and a rear seat entertainment display, are located in the vehicle, in addition to the cluster.

As the number of displays in the display apparatus for vehicles is increased, as described above, a plurality of signal processing devices for a plurality of displays is used.

However, when the plurality of signal processing devices for the plurality of displays are used, resources may be inefficiently managed if the signal processing devices do not share data.

SUMMARY

The present disclosure is directed to provide a display apparatus for vehicles capable of displaying images divided and processed by a plurality of signal processing devices in a vehicle.

The present disclosure is also directed to a display apparatus for vehicles capable of efficiently managing loads or resources in a plurality of signal processing devices for a plurality of displays in a vehicle.

The present disclosure is also directed to a display apparatus for vehicles capable of performing high-speed data communication between a plurality of virtual machines or a plurality of signal processing devices.

The present disclosure is also directed to a display apparatus for vehicles capable of performing high-speed data communication even though a plurality of virtual machines or a plurality of signal processing devices are executed by different operating systems.

According to one aspect of the subject matter described in this application, a display apparatus for a vehicle can include first, second, and third displays configured to be located in the vehicle, a first signal processing device comprising a first processor configured to perform signal processing for the first display and the second display, and a second signal processing device comprising a second processor configured to perform signal processing for the third display. The first processor can be configured to execute first, second, and third virtual machines on a hypervisor in the first processor, and the first virtual machine can be configured to transmit, from at least one of the second virtual machine or the third virtual machine to the second signal processing device, a remote processing request, receive image data processed by the second signal processing device in response to the remote processing request, and control at least one of the first display or the second display to display an image related to the received image data.

Implementations according to this aspect can include one or more of the following features. For example, the second virtual machine can be operated for the first display, the third virtual machine can be operated for the second display, and the first virtual machine can be configured to transmit, based on the remote processing request for image processing being received from at least one of the second virtual machine or the third virtual machine, the remote processing request to the second signal processing device, receive image data processed by the second signal processing device in response to the remote processing request, transmit the received image data to at least one of the second virtual machine or the third virtual machine, and control at least one of the first display or the second display to display an image related to the image data.

In some implementations, the first virtual machine can be configured to transmit the remote processing request to a server virtual machine executed in the second signal processing device, the server virtual machine can be configured to process, based on the remote processing request, image data in a guest virtual machine executed in the second signal processing device, and transmit the processed image data to the first virtual machine, and the first virtual machine can be configured to receive the image data processed by the second signal processing device, and control at least one of the first display or the second display to display an image related to the received image data.

In some examples, the server virtual machine can be configured to sort image data based on load balancing or resource balancing of a plurality of guest virtual machines executed in the second signal processing device, and transmit the sorted image data to the plurality of guest virtual machines configured to process the image data. In some implementations, the first virtual machine can be configured to sort image data based on load balancing or resource balancing of the second signal processing device, and transmit the sorted image data to the second signal processing device configured to process the image data.

In some implementations, the first signal processing device can be configured to execute a distributed processing module configured to sort image data based on load balancing or resource balancing of the second signal processing device, and transmit the sorted image data to the second signal processing device configured to process the image data. In some implementations, the image data processed by the second signal processing device can comprise a rendering object.

In some examples, an operating system executed in the first signal processing device and an operating system executed in the second signal processing device can be different from each other. In some examples, the first virtual machine can be configured to combine image data processed by the first signal processing device and the image data processed by the second signal processing device with each other, and control at least one of the first display or the second display to display a composite image related to the combined image data.

In some implementations, the first virtual machine can be configured to receive and process wheel speed sensor data of the vehicle, and transmit the processed wheel speed sensor data to at least one of the second virtual machine, the third virtual machine, or the second signal processing device. In some examples, the guest virtual machine can be configured to store the processed image data in a shared memory, and transmit, to the server virtual machine, buffer index information in the shared memory.

In some examples, the server virtual machine can be configured to transmit the processed image data to the first virtual machine based on the buffer index information. In some implementations, the display apparatus can further include a fourth display configured to be located in the vehicle and a third signal processing device comprising a third processor configured to perform signal processing for the fourth display. The first virtual machine can be configured to transmit the remote processing request from at least one of the second virtual machine or the third virtual machine to the second signal processing device and the third signal processing device, receive second image data processed by each of the second signal processing device and the third signal processing device in response to the remote processing request, and control at least one of the first display or the second display to display an image related to the received second image data.

In some examples, the first virtual machine can be configured to transmit the remote processing request to a server virtual machine executed in each of the second signal processing device and the third signal processing device. The server virtual machine executed in the second signal processing device can be configured to process the second image data by executing a guest virtual machine in the second signal processing device based on the remote processing request, and transmit the processed second image data to the first virtual machine. The server virtual machine executed in the third signal processing device can be configured to process the second image data by a guest virtual machine in the third signal processing device in response to the remote processing request, and transmit the processed second image data to the first virtual machine. The first virtual machine can be configured to receive the second image data processed by each of the second signal processing device and the third signal processing device, and control at least one of the first display or the second display to display the image related to the received second image data.

In some implementations, the first virtual machine can be configured to sort image data based on load balancing or resource balancing of each of the second signal processing device and the third signal processing device each configured to process the image data, and transmit the sorted image data to each of the second signal processing device and the third signal processing device. In some implementations, the first signal processing device can be configured to execute a distributed processing module configured to sort second image data based on load balancing or resource balancing of each of the second signal processing device and the third signal processing device, and transmit the sorted second image data to each of the second signal processing device and the third signal processing device configured to process the second image data.

According to another aspect of the subject matter described in this application a display apparatus for a vehicle can include first, second, third, and fourth displays configured to be located in the vehicle, a first signal processing device comprising a first processor configured to perform signal processing for the first display and the second display, a second signal processing device comprising a second processor configured to perform signal processing for the third display, and a third signal processing device comprising a third processor configured to perform signal processing for the fourth display. The first processor can be configured to execute first, second, and third virtual machines on a hypervisor in the first processor. The first virtual machine can be configured to sort image data based on load balancing or resource balancing of each of the second signal processing device and the third signal processing device, and transmit the sorted image data to each of a plurality of guest virtual machines configured to process the sorted image data.

Implementations according to this aspect can include one or more of the following features. For example, the first virtual machine can be configured to receive the image data processed by each of the second signal processing device and the third signal processing device, and control at least one of the first display or the second display to display an image related to the received image data.

In some implementations, an operating system executed in the first signal processing device and an operating system executed in the second signal processing device can be different from each other. In some implementations, the first virtual machine can be configured to receive and process wheel speed sensor data of the vehicle, and transmit the processed wheel speed sensor data to at least one of the second virtual machine, the third virtual machine, or the second signal processing device.

BRIEF DESCRIPTION OF THE DRAWINGS

FIGS. 8 to 14 are diagrams referred to in the description of FIG. 7.

DETAILED DESCRIPTION

Figure 1A:
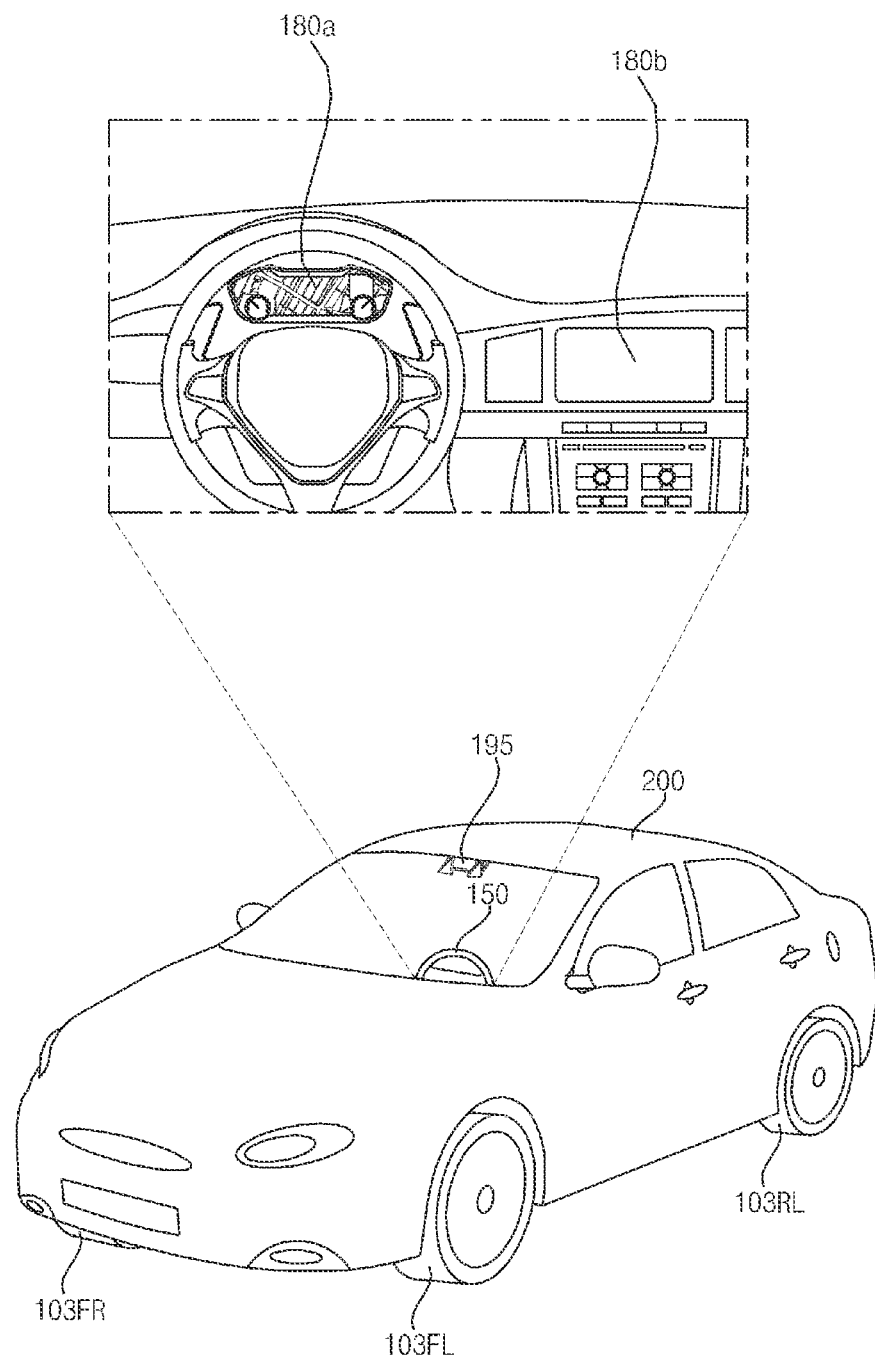
FIG. 1A is a diagram illustrating an example of the exterior and interior of a vehicle.

FIG. 1A is a diagram illustrating an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

In some implementations, the vehicle 200 can include a camera 195 configured to acquire an image of the front of the vehicle.

In some implementations, the vehicle 200 can be further provided therein with a plurality of displays 180a and 180b configured to display images and information.

In FIG. 1A, a cluster display 180a and an audio video navigation (AVN) display 180b are illustrated as the plurality of displays 180a and 180b. In addition, a head up display (HUD) can also be used.

In some implementations, the audio video navigation (AVN) display 180b can refer to a center information display.

For example, the display apparatus 100 for vehicles can include a plurality of displays 180a and 180b to divide data processing.

The vehicle 200 described in this specification can be a concept including all of a vehicle having an engine as a power source, a hybrid vehicle having an engine and an electric motor as a power source, and an electric vehicle having an electric motor as a power source.

Figure 1B:
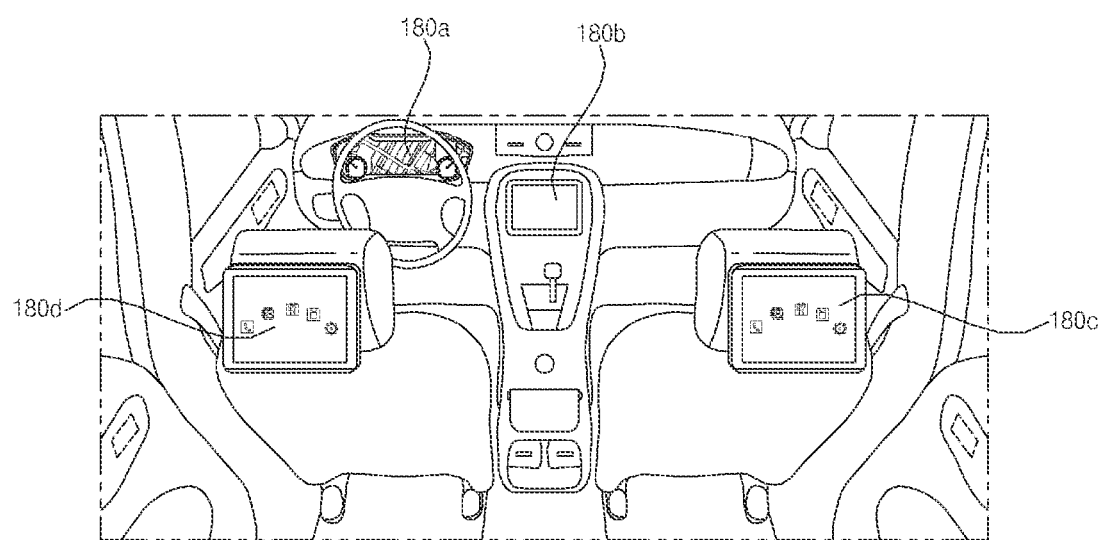
FIG. 1B is a diagram illustrating another example of the interior of the vehicle.

FIG. 1B is a diagram illustrating another example of the interior of the vehicle.

Referring to the figure, a cluster display 180a, an audio video navigation (AVN) display 180b, rear seat entertainment displays 180c and 180d, and a rear-view mirror display can be provided in the vehicle.

The display apparatus 100 for vehicles can include a plurality of displays 180a to 180d to divide data processing.

Figure 2:
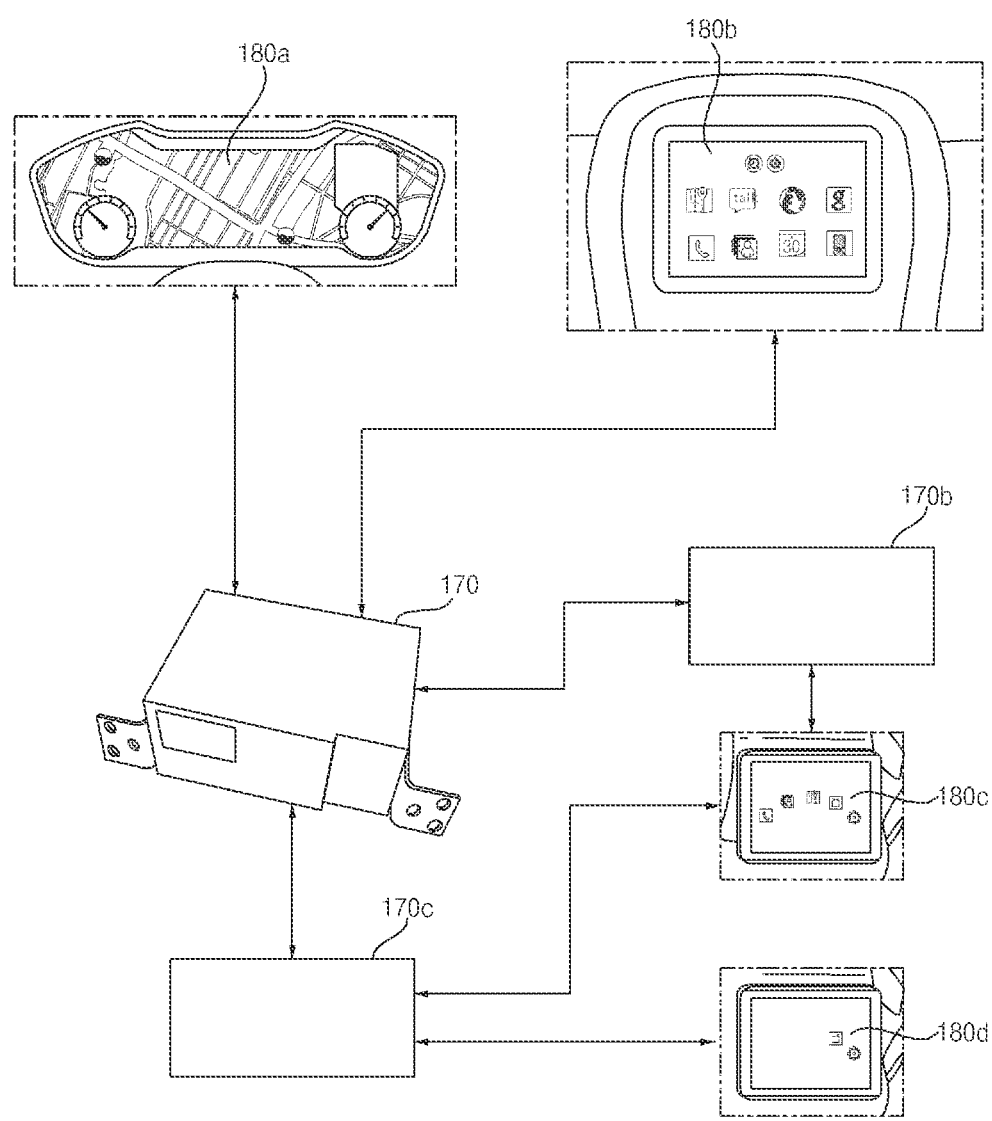
FIG. 2 is a diagram illustrating an example of an external appearance of a display apparatus for vehicles.

FIG. 2 is a diagram illustrating an example of the external appearance of a display apparatus for vehicles.

The display apparatus 100 for vehicles can include a plurality of displays 180a and 180b, a signal processing device 170 configured to perform signal processing in order to display images and information on the plurality of displays 180a and 180b, a second signal processing device 170b configured to perform signal processing in order to display an image and information on a third display 180c, and a third signal processing device 170c configured to perform signal processing in order to display an image and information on a fourth display 180d.

The signal processing device 170, the second signal processing device 170b, and the third signal processing device 170c can be spaced apart from each other.

The first display 180a, which is one of the plurality of displays 180a and 180b, can be a cluster display 180a configured to display a driving state and operation information, and the second display 180b can be an audio video navigation (AVN) display 180b configured to display vehicle driving information, a navigation map, various kinds of entertainment information, or an image.

The third display 180c can be a right rear seat entertainment display of the vehicle, and the fourth display 180d can be a left rear seat entertainment display of the vehicle.

The third display 180c can display driving state information, such as vehicle speed, simple navigation information, various kinds of entertainment information, or an image.

The fourth display 180d can display driving state information, such as vehicle speed, simple navigation information, various kinds of entertainment information, or an image.

In some implementations, the signal processing device 170 can have a processor 175 provided therein, and first to third virtual machines 520 to 540 can be executed by a hypervisor 505 in the processor 175.

The first virtual machine 520 can correspond to a server virtual machine, and the second and third virtual machines can correspond to guest virtual machines.

Consequently, data communication can be performed between the first virtual machine 520 and the second or third virtual machine 530 or 540 according to a server interface and a client interface.

The second virtual machine 530 can be operated for the first display 180a, and the third virtual machine 540 can be operated for the second display 180b.

In some implementations, the second signal processing device 170b can have a second processor 175b provided therein, and can execute a cartridge on the second processor 175b.

In addition or alternatively, the second signal processing device 170b can have a second processor 175b provided therein, and can execute a server virtual machine 520b and guest virtual machines 530b and 540b on the second processor 175b.

In some implementations, the third signal processing device 170c can have a third processor 175c provided therein, and can execute a cartridge on the third processor 175c.

In addition or alternatively, the third signal processing device 170c can have a third processor 175c provided therein, and can execute a server virtual machine 520c and guest virtual machines 530c and 540c on the third processor 175c.

In some implementations, the first virtual machine 520 in the processor 175 shares at least some of data with the second signal processing device 170b or the third signal processing device 170c for divided processing of data. Consequently, images divided and processed by the plurality of signal processing devices 170, 170b, and 170c in the vehicle can be displayed.

In some implementations, the first virtual machine 520 in the processor 175 can receive and process wheel speed sensor data of the vehicle, and can transmit the processed wheel speed sensor data to at least one of the second virtual machine 530, the third virtual machine 540, the second signal processing device 170b, or the third signal processing device 170c. Consequently, at least one of virtual machines 530 and 540, the second signal processing device 170b, or the third signal processing device 170c can share the wheel speed sensor data of the vehicle.

In some implementations, the first virtual machine 520 in the processor 175 writes some of data in a first shared memory 508a so as to be transmitted to the second virtual machine 530, and writes some other of data in the first shared memory 508a so as to be transmitted to the third virtual machine 540. The second virtual machine 530 and the third virtual machine 540 can process the received data, and can be configured to write the processed data in a second shared memory 508b. Consequently, images divided and processed by the plurality of virtual machines in the vehicle can be displayed.

In some implementations, the first virtual machine 520 in the processor 175 can be configured to set a shared memory 508 based on the hypervisor 505 for transmission of the same data to the second virtual machine 530 and the third virtual machine 540. Consequently, the first display 180a and the second display 180b in the vehicle can display the same information or the same images in a synchronized state.

In some implementations, the second signal processing device 170b can have a second processor 175b therein, and can execute a server virtual machine 520b and a guest virtual machine 530b on a hypervisor 505b in the second processor 175b.

In some implementations, the third signal processing device 170c may have a third processor 175c therein, and may execute a server virtual machine 520c and a guest virtual machine 530c on a hypervisor 505c in the third processor 175c.

In some implementations, some of the plurality of displays 180a to 180d can be operated based on a Linux Operating System (OS), some other can be operated based on a Web OS, and some other can be operated based on Android.

In some implementations, the signal processing device 170, the second signal processing device 170b, and the third signal processing device 170c can be operated according to different operating systems (OS).

For example, the signal processing device 170 can be operated according to a Linux-based operating system, the second signal processing device 170b can be operated according to an Android-based operating system, and the third signal processing device 170c can be operated according to a Web OS-based operating system.

The signal processing device 170, the second signal processing device 170b, and the third signal processing device 170c can divide and process data for the displays 180a to 180d configured to be operated under various operating systems.

In some implementations, the signal processing device 170, the second signal processing device 170b, and the third signal processing device 170c can be configured to also display the same information or the same images in a synchronized state on the displays 180a to 180d configured to be operated under various operating systems.

Figure 3:
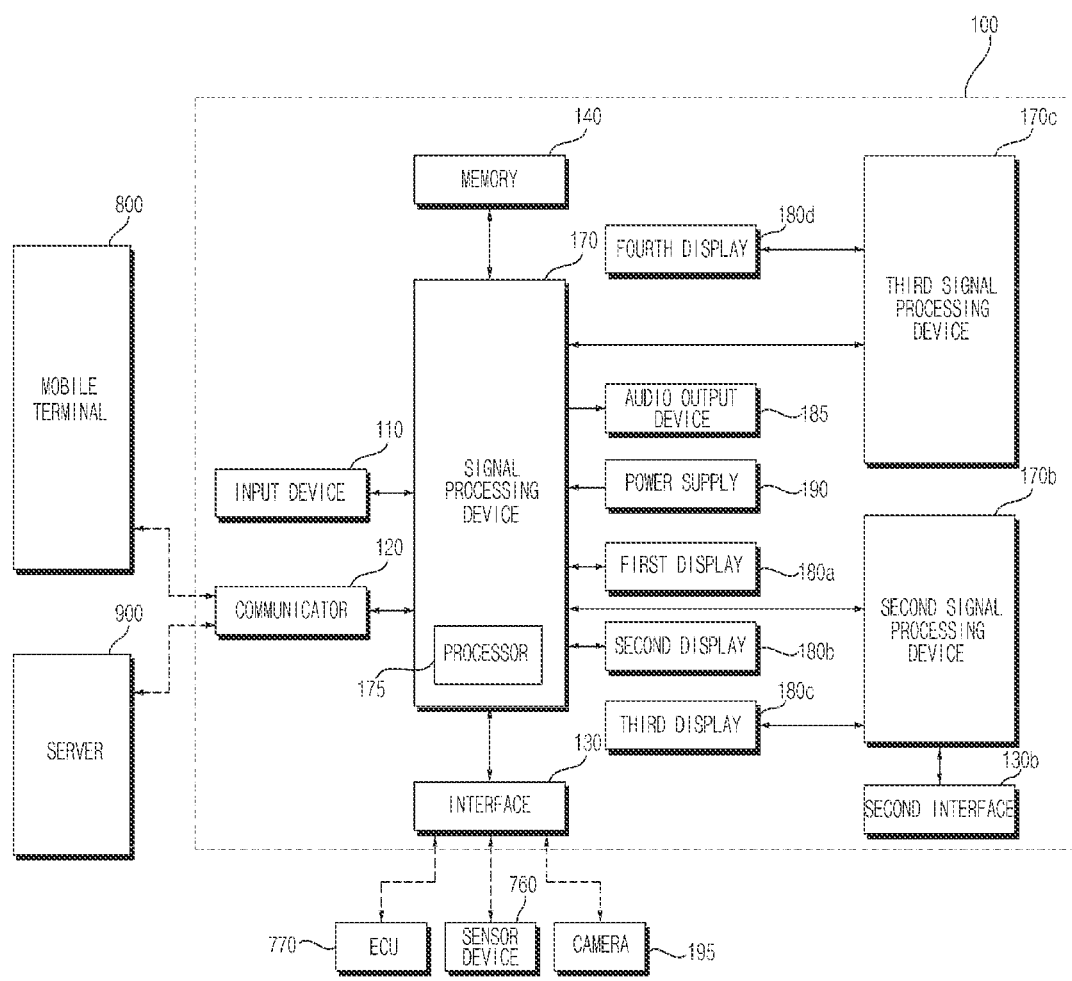
FIG. 3 is a diagram illustrating an example of an internal block diagram of the display apparatus for vehicles of FIG. 2.

FIG. 3 is a diagram illustrating an example of an internal block diagram of the display apparatus for vehicles.

Referring to the figure, the display apparatus 100 for vehicles can include an input device 110, a communicator 120, an interface 130, a second interface 130b, a memory 140, a signal processing device 170, a second signal processing device 170b, a third signal processing device 170c, a plurality of displays 180a to 180d, an audio output device 185, and a power supply 190.

The input device 110 can include a physical button or pad for button input or touch input.

In some implementations, the input device 110 can include a microphone for user voice input.

The communicator 120 can wirelessly exchange data with a mobile terminal 800 or a server 900.

In particular, the communicator 120 can wirelessly exchange data with a mobile terminal of a vehicle driver. Any of various data communication schemes, such as Bluetooth, Wi-Fi, WIFI Direct, and APIX, can be used as a wireless data communication scheme.

The communicator 120 can receive weather information and road traffic situation information, such as transport protocol expert group (TPEG) information, from the mobile terminal 800 or the server 900. In some implementations, the communicator 120 can include a mobile communication module.

The interface 130 can receive sensor information from an electronic control unit (ECU) 770 or a sensor device 760, and can transmit the received information to the signal processing device 170.

The second interface 130b can receive sensor information from the electronic control unit (ECU) 770 or the sensor device 760, and can transmit the received information to the second signal processing device 170b.

In some implementations, the sensor information can include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, or in-vehicle humidity information.

The sensor information can be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. In some implementations, the position module can include a GPS module configured to receive GPS information.

In some implementations, the interface 130 can receive front-of-vehicle image data, side-of-vehicle image data, rear-of-vehicle image data, and obstacle-around-vehicle distance information from a camera 195 or lidar, and can transmit the received information to the signal processing device 170.

The memory 140 can store various data necessary for overall operation of the display apparatus 100 for vehicles, such as programs for processing or control of the signal processing device 170.

For example, the memory 140 can store data about the hypervisor and first to third virtual machines executed by the hypervisor in the processor 175.

The audio output device 185 can convert an electrical signal from the signal processing device 170 into an audio signal, and can output the audio signal. In some implementations, the audio output device 185 can include a speaker.

The power supply 190 can supply power necessary to operate components under control of the signal processing device 170. In particular, the power supply 190 can receive power from a battery in the vehicle.

The signal processing device 170 can control overall operation of each device in the display apparatus 100 for vehicles.

For example, the signal processing device 170 can include a processor 175 configured to perform signal processing for the displays 180a and 180b.

The processor 175 can execute the first to third virtual machines 520 to 540 on the hypervisor 505 (see FIG. 5) in the processor 175.

Among the first to third virtual machines 520 to 540 (see FIG. 5), the first virtual machine 520 can be a server virtual machine, and the second and third virtual machines 530 and 540 can be guest virtual machines.

The second virtual machine 530 can be operated for the first display 180a, and the third virtual machine 540 can be operated for the second display 180b.

For example, the first virtual machine 520 in the processor 175 can receive, process, and output vehicle sensor data, position information data, camera image data, audio data, or touch input data. Data processed only by a legacy virtual machine and data processed by the first virtual machine 520 can be distinguished from each other, whereby data processing can be efficiently performed. In particular, the first virtual machine 520 can process most of the data, whereby 1:N data sharing can be achieved. For example, first virtual machine 520 can more efficiently process data by processing most of the data and the remaining data are processed by sharing the data with other virtual machines.

As another example, the first virtual machine 520 can directly receive and process CAN communication data, audio data, radio data, USB data, and wireless communication data for the second and third virtual machines 530 and 540.

The first virtual machine 520 can transmit the processed data to the second and third virtual machines 530 and 540.

Consequently, only the first virtual machine 520, among the first to third virtual machines 520 to 540, can receive communication data and external input data, and can perform signal processing, whereby load in signal processing by the other virtual machines can be reduced and 1:N data communication can be achieved, and therefore synchronization at the time of data sharing can be achieved.

In some implementations, the first virtual machine 520 in the processor 175 writes some of data in the first shared memory 508a so as to be transmitted to the second virtual machine 530, and writes some other of data in the first shared memory 508a so as to be transmitted to the third virtual machine 540. The second virtual machine 530 and the third virtual machine 540 can process the received data, and can be configured to write the processed data in the second shared memory 508b. Consequently, images divided and processed by the plurality of signal processing devices in the vehicle can be displayed.

In some implementations, data may be any one of image data, audio data, navigation data, or voice recognition data.

In some implementations, the first virtual machine 520 can process some other of data, and can be configured to write the processed data in the second shared memory 508b. For example, the first virtual machine 520 can perform data processing in addition to the second virtual machine 530 and the third virtual machine 540.

In some implementations, the first virtual machine 520 can create command queues for distributed processing of data in the second virtual machine 530 and the third virtual machine 540. Consequently, the plurality of virtual machines can divide and process data.

In some implementations, in response to the second virtual machine 530 and the third virtual machine 540 sharing the same data, the first virtual machine 520 in the processor 175 can create one command queue. Consequently, the same data can be synchronized and shared.

In some implementations, the first virtual machine 520 can create command queues corresponding to the number of virtual machines for distributed processing of data.

In some implementations, the first virtual machine 520 can be configured to transmit at least some of data to at least one of the second virtual machine 530 or the third virtual machine 540 or the second signal processing device 170b for distributed processing of data.

For example, the first virtual machine 520 can allocate the first shared memory 508a for transmitting at least some of data to at least one of the second virtual machine 530, the third virtual machine 540, or the second signal processing device 170b, and image data processed by the second virtual machine 530 or the third virtual machine 540 can be written in the second shared memory 508b.

In some implementations, the first virtual machine 520 can be configured to write data in the shared memory 508, whereby the second virtual machine 530 and the third virtual machine 540 share the same data.

For example, the first virtual machine 520 can be configured to write radio data or wireless communication data in the shared memory 508, whereby the second virtual machine 530 and the third virtual machine 540 share the same data. Consequently, 1:N data sharing can be achieved.

In some implementations, the first virtual machine 520 can process most of the data, whereby 1:N data sharing can be achieved.

In some implementations, the first virtual machine 520 in the processor 175 can be configured to set the shared memory 508 based on the hypervisor 505 to transmit the same data to the second virtual machine 530 and the third virtual machine 540.

For example, the first virtual machine 520 in the processor 175 can transmit the same data to the second virtual machine 530 and the third virtual machine 540 in a synchronized state using the shared memory 508 based on the hypervisor 505. Consequently, the plurality of displays 180a and 180b in the vehicle can display the same images in a synchronized state.

In some implementations, the signal processing device 170 can process various signals, such as an audio signal, an image signal, and a data signal. In some implementations, the signal processing device 170 can be implemented in the form of a system on chip (SOC).

The second signal processing device 170b can perform signal processing for the display 180c for vehicles, and can include a second processor 175b.

The second processor 175b can execute the server virtual machine 520b and the guest virtual machines 530b and 540b on the hypervisor 505b (FIG. 8) in the second processor 175b.

For example, the server virtual machine 520b in the second processor 175b can receive, process, and output vehicle sensor data, position information data, camera image data, audio data, or touch input data from the first virtual machine 520 in the processor 175 in the signal processing device 170.

As another example, the server virtual machine 520b can receive and process CAN communication data, audio data, radio data, USB data, and wireless communication data from the first virtual machine 520 in the processor 175 in the signal processing device 170 for the guest virtual machines 530b and 540b.

The server virtual machine 520b can transmit the processed data to the guest virtual machines 530b and 540b.

Consequently, only the server virtual machine 520b, among the server virtual machine 520b and the guest virtual machines 530b and 540b, can receive communication data and external input data, and can perform signal processing, whereby signal processing load of the guest virtual machines 530b and 540b may be reduced and 1:N data communication can be achieved, and therefore synchronization at the time of data sharing can be achieved.

In some implementations, the server virtual machine 520b writes some of data in the shared memory 508b so as to be transmitted to the guest virtual machine 530b, and the guest virtual machines 530b and 540b can process the received data and can be configured to write the processed data in the shared memory 508b. Consequently, images divided and processed by the plurality of signal processing devices in the vehicle can be displayed.

In some implementations, data can be any one of image data, audio data, navigation data, and voice recognition data.

In some implementations, the server virtual machine 520b can create command queues for distributed processing of data in the second virtual machine 530 and the third virtual machine 540. Consequently, the plurality of virtual machines can divide and process data.

In some implementations, in response to the second virtual machine 530 and the third virtual machine 540 sharing the same data, the server virtual machine 520b in the second processor 175*b* can create one command queue. Consequently, the same data can be synchronized and shared.

In some implementations, the server virtual machine 520*b* can create command queues corresponding to the number of virtual machines for distributed processing of data.

In some implementations, the server virtual machine 520*b* can be configured to transmit at least some of data to at least one of the guest virtual machines 530*b* or 540*b* for distributed processing of data.

For example, the server virtual machine 520*b* can allocate the shared memory 508*b* for transmitting at least some of data to at least one of the guest virtual machines 530*b* or 540*b*, and image data processed by the guest virtual machine 530*b* or the guest virtual machine 540*b* can be written in the shared memory 508*b*.

In some implementations, the server virtual machine 520*b* can be configured to write data in the shared memory 508*b*, whereby the guest virtual machines 530*b* and 540*b* share the same data.

For example, the server virtual machine 520*b* can be configured to write radio data or wireless communication data in the shared memory 508*b*, whereby the guest virtual machines 530*b* and 540*b* share the same data. Consequently, 1:N data sharing can be achieved.

In some implementations, the server virtual machine 520*b* can process most of the data, whereby 1:N data sharing can be achieved.

In some implementations, the server virtual machine 520*b* in the second processor 175*b* can be configured to set the shared memory 508*b* based on the hypervisor 505*b* to transmit the same data to the guest virtual machines 530*b* and 540*b*.

For example, the server virtual machine 520*b* in the second processor 175*b* can transmit the same data to the guest virtual machines 530*b* and 540*b* in a synchronized state using the shared memory 508*b* based on the hypervisor 505*b*. Consequently, the plurality of displays 180*c* and 180*d* in the vehicle can display the same images in a synchronized state.

In some implementations, the second signal processing device 170*b* can process various signals, such as an audio signal, an image signal, and a data signal. In some implementations, the second signal processing device 170*b* can be implemented in the form of a system on chip (SOC).

The third signal processing device 170*c* can perform signal processing for the display 180*d* for vehicles, and can include a third processor 175*c*.

The third processor 175*c* can execute the server virtual machine 520*c* and the guest virtual machines 530*c* and 540*c* on the hypervisor 505*c* in the third processor 175*c*.

For example, the server virtual machine 520*c* in the third processor 175*c* can receive, process, and output vehicle sensor data, position information data, camera image data, audio data, or touch input data from the first virtual machine 520 in the processor 175 in the signal processing device 170.

As another example, the server virtual machine 520*c* can receive and process CAN communication data, audio data, radio data, USB data, and wireless communication data from the first virtual machine 520 in the processor 175 in the signal processing device 170 for the guest virtual machines 530*c* and 540*c*.

The server virtual machine 520*c* can transmit the processed data to the guest virtual machines 530*c* and 540*c*.

Consequently, only the server virtual machine 520*c*, among the server virtual machine 520*c* and the guest virtual machines 530*c* and 540*c*, can receive communication data and external input data, and can perform signal processing, whereby signal processing load of the guest virtual machines 530*c* and 540*c* can be reduced and 1:N data communication can be achieved, and therefore synchronization at the time of data sharing can be achieved.

In some implementations, the server virtual machine 520*c* writes some of data in the shared memory 508*c* so as to be transmitted to the guest virtual machine 530*c*, and the guest virtual machines 530*c* and 540*c* can process the received data and can be configured to write the processed data in the shared memory 508*c*. Consequently, images divided and processed by the plurality of signal processing devices in the vehicle can be displayed.

In some implementations, data can be any one of image data, audio data, navigation data, or voice recognition data.

In some implementations, the server virtual machine 520*c* can create command queues for distributed processing of data in the second virtual machine 530 and the third virtual machine 540. Consequently, the plurality of virtual machines can divide and process data.

In some implementations, in response to the second virtual machine 530 and the third virtual machine 540 sharing the same data, the server virtual machine 520*c* in the third processor 175*c* can create one command queue. Consequently, the same data can be synchronized and shared.

In some implementations, the server virtual machine 520*c* can create command queues corresponding to the number of virtual machines for distributed processing of data.

In some implementations, the server virtual machine 520*c* can be configured to transmit at least some of data to at least one of the guest virtual machines 530*c* or 540*c* for distributed processing of data.

For example, the server virtual machine 520*c* can allocate the shared memory 508*c* for transmitting at least some of data to at least one of the guest virtual machines 530*c* or 540*c*, and image data processed by the guest virtual machine 530*c* or the guest virtual machine 540*c* can be written in the shared memory 508*c*.

In some implementations, the server virtual machine 520*c* can be configured to write data in the shared memory 508*c*, whereby the guest virtual machines 530*c* and 540*c* share the same data.

For example, the server virtual machine 520*c* can be configured to write radio data or wireless communication data in the shared memory 508*c*, whereby the guest virtual machines 530*c* and 540*c* share the same data. Consequently, 1:N data sharing can be achieved.

In some implementations, the server virtual machine 520*c* can process most of the data, whereby 1:N data sharing can be achieved.

In some implementations, the server virtual machine 520*c* in the third processor 175*c* can be configured to set the shared memory 508*c* based on the hypervisor 505*c* to transmit the same data to the guest virtual machines 530*c* and 540*c*.

For example, the server virtual machine 520*c* in the third processor 175*c* can transmit the same data to the guest virtual machines 530*c* and 540*c* in a synchronized state using the shared memory 508*c* based on the hypervisor 505*c*. Consequently, the plurality of displays 180*c* and 180*d* in the vehicle can display the same images in a synchronized state.

In some implementations, the third signal processing device 170*c* can process various signals, such as an audio signal, an image signal, and a data signal. In some implementations, the third signal processing device 170*c* can be implemented in the form of a system on chip (SOC).

Figure 4:
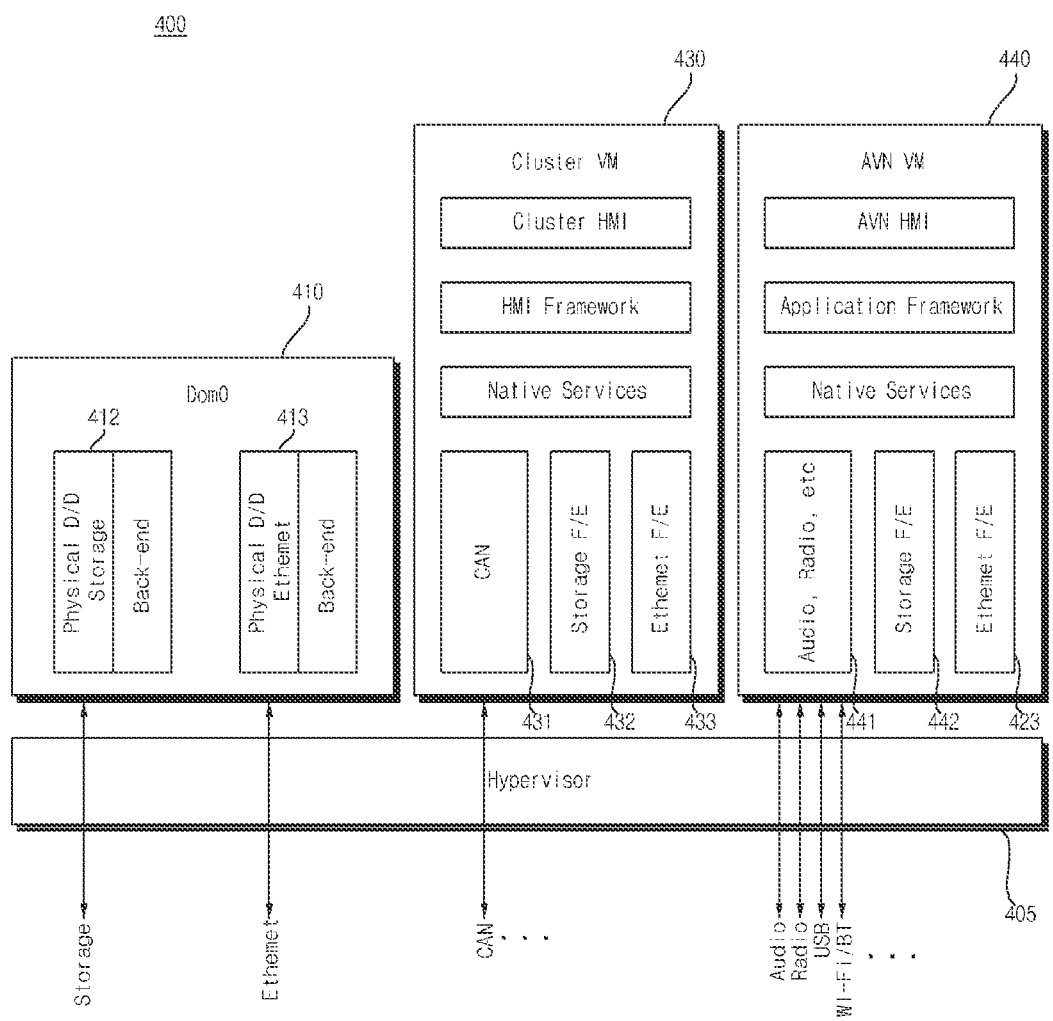
FIG. 4 is a diagram illustrating an example of a system executed in a signal processing device.

FIG. 4 is a diagram illustrating an example of a system executed in a signal processing device.

Referring to the figure, FIG. 4 depicts that virtual machines are used for the cluster display 180a and the AVN display 180b.

The system 400 executed in the signal processing device of FIG. 4 illustrates that a cluster virtual machine 430 and an AVN virtual machine 440 are executed on a hypervisor 405 in the processor 175 in the signal processing device 170.

In some implementations, the system 400 executed in the signal processing device of FIG. 4 illustrates that a legacy virtual machine 410 is also executed on the hypervisor 405 in the processor 175.

The legacy virtual machine 410 can include an interface 412 for data communication with the memory 140 and an interface 413 for Ethernet communication.

In some implementations, the cluster virtual machine 430 can include an interface 431 for CAN communication, an interface 432 for communication with the interface 412 of the legacy virtual machine 410, and an interface 433 for communication with the interface 413 of the legacy virtual machine 410.

In some implementations, the AVN virtual machine 440 can include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there may be a disadvantage in that CAN communication data are input and output only in the cluster virtual machine 430, whereby the CAN communication data cannot be utilized in the AVN virtual machine 440.

Also, in the system 400 of FIG. 4, there may be a disadvantage in that audio data, radio data, USB data, and wireless communication data are input and output only in the AVN virtual machine 440, whereby these data cannot be utilized in the cluster virtual machine 430.

Further, there may be a disadvantage in that the cluster virtual machine 430 and the AVN virtual machine 440 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. For example, virtual machines can be classified into a server virtual machine and guest virtual machines for inputting and outputting various memory data and communication data not in the guest virtual machines but in the server virtual machine. This will be described with reference to FIG. 5 and subsequent figures.

Figure 5:
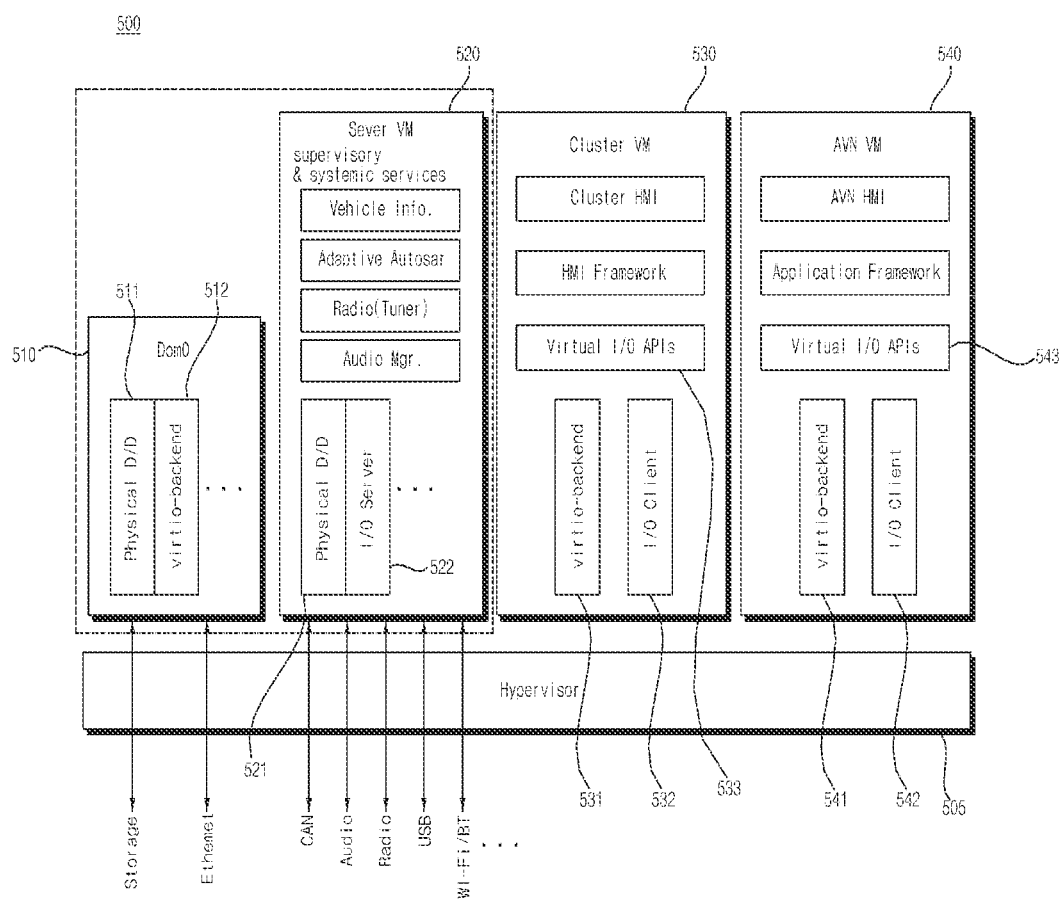
FIG. 5 is a diagram illustrating another example of a system executed in a signal processing device.

FIG. 5 is a diagram illustrating another example of a system executed in a signal processing device.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, are executed on the hypervisor 505 in the processor 175 of the signal processing device 170.

The second virtual machine 530 can be a virtual machine for the cluster display 180a, and the third virtual machine 540 can be a virtual machine for the AVN display 180b.

For example, the second virtual machine 530 and the third virtual machine 540 can be operated for image rendering of the cluster display 180a and the AVN display 180b, respectively.

In some implementations, the system 50 executed in the signal processing device 170 of FIG. 5 illustrates that a legacy virtual machine 510 is also executed on the hypervisor 505 in the processor 175.

The legacy virtual machine 510 can include an interface 511 for data communication with the memory 140 and Ethernet communication.

In some implementations, the legacy virtual machine 510 can further include a virtual input and output device backend (virtio-backend) interface 512 for data communication with the second and third virtual machines 530 and 540.

The first virtual machine 520 can include an interface 521 for input and output of audio data, radio data, USB data, and wireless communication data and an input and output server interface 522 for data communication with the guest virtual machines.

For example, the first virtual machine 520, which is a server virtual machine, can provide inputs/outputs (I/O) difficult to virtualize with standard virtualization technology (VirtIO) to a plurality of guest virtual machines, such as the second and third virtual machines 530 and 540.

In some implementations, the first virtual machine 520, which is a server virtual machine, can control radio data and audio data at a supervisor level, and can provide the data to a plurality of guest virtual machines, such as the second and third virtual machines 530 and 540.

In some implementations, the first virtual machine 520, which is a server virtual machine, can process vehicle data, sensor data, and surroundings-of-vehicle information, and can provide the processed data or information to a plurality of guest virtual machines, such as the second and third virtual machines 530 and 540.

In some implementations, the first virtual machine 520 may provide supervisory services, such as processing of vehicle data and audio routing management.

In some implementations, the second virtual machine 530 can include an input and output client interface 532 for data communication with the first virtual machine 520 and APIs 533 configured to control the input and output client interface 532.

In some implementations, the second virtual machine 530 can include a virtio-backend interface 531 for data communication with the legacy virtual machine 510.

The second virtual machine 530 can receive memory data by communication with the memory 140 and Ethernet data by Ethernet communication from the virtio-backend interface 512 of the legacy virtual machine 510 through the virtio-backend interface.

In some implementations, the third virtual machine 540 can include an input and output client interface 542 for data communication with the first virtual machine 520 and APIs 543 configured to control the input and output client interface 542.

In some implementations, the third virtual machine 540 can include a virtio-backend interface 541 for data communication with the legacy virtual machine 510.

The third virtual machine 540 can receive memory data by communication with the memory 140 and Ethernet data by Ethernet communication from the virtio-backend interface 512 of the legacy virtual machine 510 through the virtio-backend interface 541.

In some implementations, the legacy virtual machine 510 can be provided in the first virtual machine 520.

In the system 500, CAN communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 can be achieved.

In addition, in the system 500 of FIG. 5, audio data, radio data, USB data, and wireless communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 can be achieved.

In some implementations, in the system 500 of FIG. 5, the second and third virtual machines 530 and 540 can be operated based on different operating systems.

For example, the second virtual machine 530 can be operated based on a Linux OS, and the third virtual machine 540 can be operated based on a Web OS.

In the first virtual machine 520, the shared memory 508 based on the hypervisor 505 can be set for data sharing, even though the second and third virtual machines 530 and 540 are operated based on different operating systems. Even though the second and third virtual machines 530 and 540 are operated based on different operating systems, therefore, the same data or the same images can be shared in a synchronized state. Eventually, the plurality of displays 180a and 180b can display the same data or the same images in a synchronized state.

Figure 6:
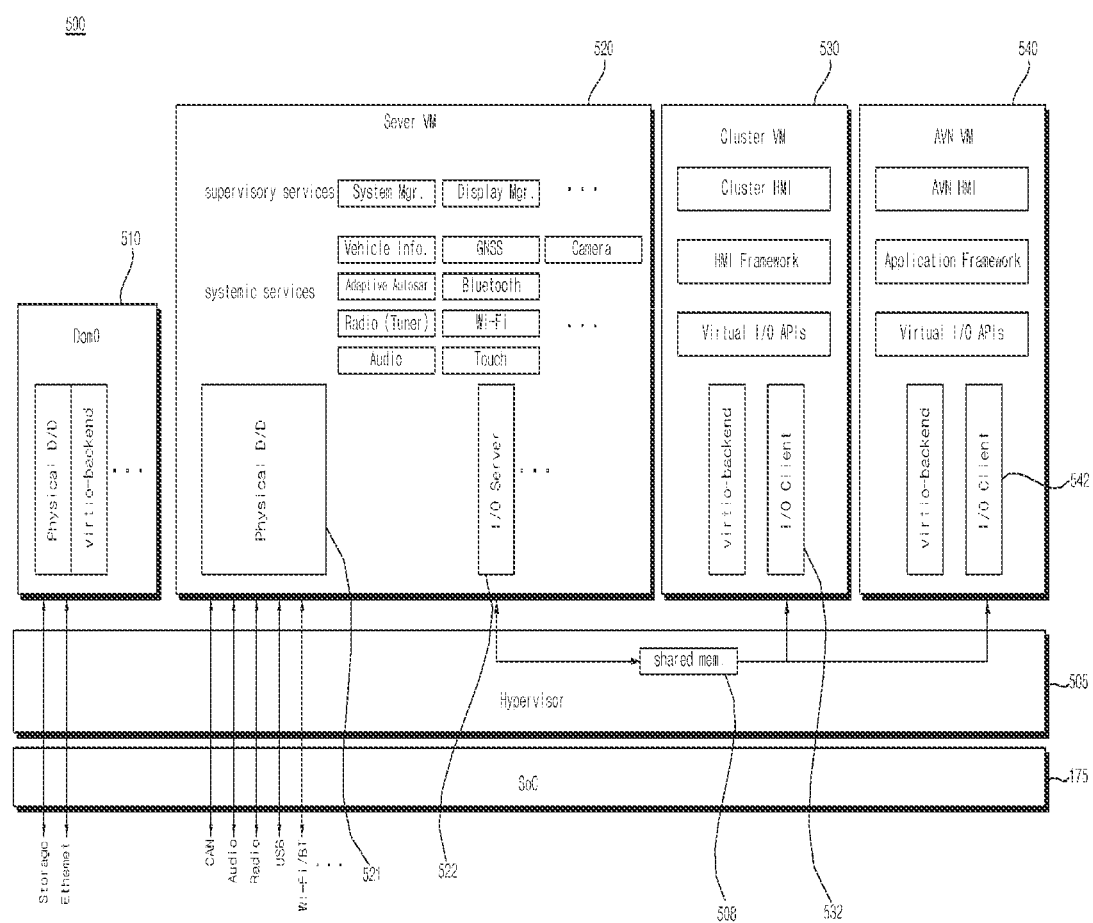
FIG. 6 is a diagram describing an operation of the system executed in the signal processing device.

FIG. 6 is a diagram describing an operation of the system executed in the signal processing device.

Referring to the figure, the processor 175 in the signal processing device 170 can execute the first to third virtual machines 520 to 540 on the hypervisor 505 in the processor 175, and the first virtual machine 520 in the processor 175 can be configured to set the shared memory 508 based on the hypervisor 505 for transmission of the same data to the second and third virtual machines 530 and 540.

For example, the same image data may be illustrated as the same data. Consequently, the plurality of displays 180a and 180b in the vehicle can display the same images in a synchronized state.

In some implementations, in the system 500 of FIG. 6, the processor 175 in the signal processing device 170 executes the first to third virtual machines 520 to 540 on the hypervisor 505 in the processor 175, and the first virtual machine 520 in the processor 175 can transmit the same data to the second and third virtual machines 530 and 540 in a synchronized state using the shared memory 508 based on the hypervisor 505.

For example, CAN communication data, audio data, radio data, USB data, wireless communication data, position information data, or touch data may be illustrated as the same data. Consequently, the plurality of displays 180a and 180b in the vehicle can display the same data in a synchronized state.

In some implementations, the legacy virtual machine 510 can transmit memory data from the memory 140 and Ethernet data by Ethernet communication to the second and third virtual machines 530 and 540 in a synchronized state using the shared memory 508 based on the hypervisor 505. For example, it is possible to perform 1:N data communication with respect to the memory data or the Ethernet data, whereby it is possible to transmit the same data in a synchronized state.

In some implementations, in response to the virtual machines being used to display images requiring lots of resources, such as rendering of a 3D application, in the display apparatus 100 for vehicles, the virtual machines can share graphical resources. In response to a heavy application being executed in the virtual machine, therefore, graphics processing unit (GPU) resources may be deficient.

In some implementations, a distributed rendering technique of performing image rendering using the signal processing devices 170b and 170c except the signal processing device 170 and receiving the result of image rendering can be used.

For example, a display apparatus 100 for vehicles can include a signal processing device 170 including a processor 175 configured to perform signal processing for a first display 180a and a second display 180b and a second signal processing device 170b including a second processor 175b configured to perform signal processing for a third display 180c, wherein the processor 175 in the signal processing device 170 executes first to third virtual machines 520 to 540 on a hypervisor 505 in the processor 175, the first virtual machine 520 is configured to transmit a remote processing request from at least one of the second virtual machine or the third virtual machine 530 and 540 to the second signal processing device 170b, receive image data processed by the second signal processing device 170b in response to the remote processing request, and control at least one of the first display 180a or the second display 180b to display an image related to the received image data. Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources. For example, the plurality of signal processing devices 170 and 170b can more efficiently manage loads and resources by dividing images between the plurality of signal processing devices 170 and 170b for processing.

In some implementations, the second virtual machine 530 can be operated for the first display 180a, the third virtual machine 540 can be operated for the second display 180b, and in response to a remote processing request for image processing being received from at least one of the second virtual machine or the third virtual machine 530 and 540, the first virtual machine 520 can be configured to transmit remote processing request to the second signal processing device 170b, can receive image data processed by the second signal processing device 170b in response to the remote processing request, can transmit the received image data to at least one of the second virtual machine or the third virtual machine 530 and 540, and can perform control such that an image related to the image data is displayed on at least one of the first display 180a or the second display 180b. Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources.

In some implementations, the first virtual machine 520 can be configured to transmit remote processing request to a server virtual machine 520b executed in the second signal processing device 170b, the server virtual machine 520b in the second signal processing device 170b can be configured to process image data in guest virtual machines 530b and 540b in the second signal processing device 170b in response to the remote processing request and can transmit the processed image data to the first virtual machine 520, and the first virtual machine 520 can receive the image data processed by the second signal processing device 170b and can control at least one of the first display 180a or the second display 180b to display an image related to the received image data. Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources.

In some implementations, the server virtual machine 520b in the second signal processing device 170b can sort image data to be processed by the plurality of guest virtual machines 530b and 540b in consideration of load balancing or resource balancing of the plurality of guest virtual machines 530b and 540b in the second signal processing device 170b, and can transmit the sorted image data to be processed to the plurality of guest virtual machines 530b and 540b. Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources.

In some implementations, the first virtual machine 520 can sort image data to be processed by the second signal processing device 170b in consideration of load balancing or resource balancing of the second signal processing device 170b, and can transmit the sorted image data to be processed to the second signal processing device 170b. Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources.

In some implementations, the operating system executed in the signal processing device 170 and the operating system executed in the second signal processing device 170b can be different from each other. Consequently, high-speed data communication can be performed even though the plurality of virtual machines or the plurality of signal processing devices 170 and 170b is executed by different operating systems.

In some implementations, the first virtual machine 520 can combine the image data processed by the signal processing device 170 and the image data processed by the second signal processing device 170b with each other, and can control at least one of the first display 180a or the second display 180b to display a composite image related to the combined image data. Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources. This will be described with reference to FIG. 7 or subsequent figures.

Figure 7:
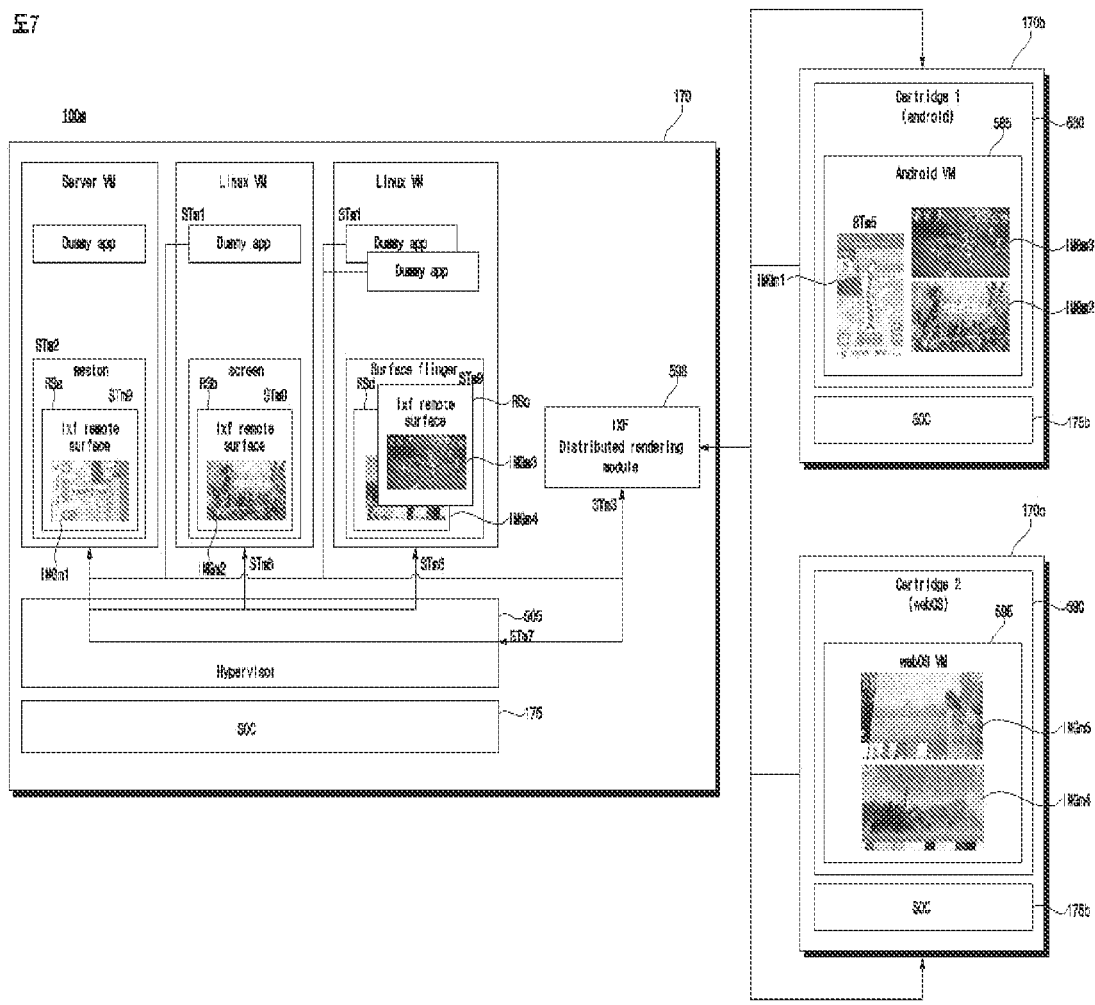
FIG. 7 is a diagram illustrating an example of a system executed in the display apparatus for vehicles.

FIG. 7 is a diagram illustrating an example of a system executed in the display apparatus for vehicles.

Referring to the figure, the display apparatus 100 for vehicles can include a signal processing device 170 including a processor 175 configured to perform signal processing for a first display 180a and a second display 180b and a second signal processing device 170b including a second processor 175b configured to perform signal processing for a third display 180c.

The processor 175 in the signal processing device 170 can execute first to third virtual machines 520 to 540 on a hypervisor 505 in the processor 175.

In some implementations, the signal processing device 170 can execute a distributed processing module 598 configured to sort image data to be processed by the second signal processing device 170b in consideration of load balancing or resource balancing of the second signal processing device 170b and to transmit the sorted image data to be processed to the second signal processing device 170b.

In some implementations, the second signal processing device 170b can execute a cartridge 580, and can execute a virtual machine 585 in the cartridge 580. The cartridge 580 or the virtual machine 585 executed in the second signal processing device 170b can be an Android-based cartridge or virtual machine.

In some implementations, the third signal processing device 170c can execute a cartridge 590, and can execute a virtual machine 595 in the cartridge 590. The cartridge 590 or the virtual machine 595 executed in the third signal processing device 170c can be a Web OS-based cartridge or virtual machine.

The figure illustrates that a dummy application and an image-related application (Weston or Surface Flinger) can be executed in each of the first to third virtual machines 520 to 540.

First, in response to the dummy application being executed, the second and third virtual machines 530 and 540 can transmit a remote processing request to the first virtual machine 520 (STm1).

Subsequently, the first virtual machine 520 can receive load information and resource information of each of the second signal processing device 170b and the third signal processing device 170c.

The first virtual machine 520 can check a signal processing device or a virtual machine in the signal processing device having available loads or resources based on the load information and resource information of each of the second signal processing device 170b and the third signal processing device 170c (STm2).

The first virtual machine 520 can be configured to transmit the remote processing request to the distributed processing module 598 (STm3).

The distributed processing module 598 can transmit the remote processing request to the signal processing device or a virtual machine in the signal processing device having available loads or resources (STm4).

For example, the distributed processing module 598 transmits the remote processing request only to the second signal processing device 170b.

By way of further example, as depicted FIG. 7, the distributed processing module 598 transmits the remote processing request to each of the second signal processing device 170b and the third signal processing device 170c.

Subsequently, the second signal processing device 170b can process image data through the application executed in the virtual machine 585 therein according to the received remote processing request (STm5).

In some implementations, the processed image data can include a rendering object.

For example, the second signal processing device 170b can process a rendering object or a rendering image through the application executed in the virtual machine 585 therein according to the received remote processing request.

In some implementations, the third signal processing device 170c can process image data through the application executed in the virtual machine 595 therein according to the received remote processing request.

For example, the third signal processing device 170c can process a rendering object or a rendering image through the application executed in the virtual machine 595 therein according to the received remote processing request.

Subsequently, the second signal processing device 170b can transmit the processed image data IMGm1 to IMGm3 to the distributed processing module 598 (STm6).

In some implementations, the third signal processing device 170c transmits the processed image data IMGm4 and IMGm5 to the distributed processing module 598.

Subsequently, the distributed processing module 598 can transmit the processed image data IMGm1 to IMGm5 received from the second signal processing device 170b and the third signal processing device 170c to the first virtual machine 520 (STm7).

Subsequently, the first virtual machine 520 can be configured to transmit the processed image data IMGm1 to IMGm5 to the first virtual machine 520, the second virtual machine 530, and the third virtual machine 540 (STm8).

As depicted in FIG. 7, among the processed image data IMGm1 to IMGm5, the first image data IMGm1 are transmitted to the first virtual machine 520, the second image data IMGm2 can be transmitted to the second virtual machine 530, and the third image data IMGm3 and the fourth image data IMGm4 can be transmitted to the third virtual machine 540.

Subsequently, the second virtual machine 530 and the third virtual machine 540 can be configured to combine the received image data with self-processed image data, and display composite images related to the combined image data on the displays 180a and 180c, respectively, (STm9).

For example, a composite image including the second image data IMGm2 can be displayed on the first display 180a under control of the second virtual machine 530.

By way of further example, a composite image including the third image data IMGm3 and the fourth image data IMGm4 can be displayed on the second display 180b under control of the third virtual machine 540.

Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources.

In some implementations, a first virtual machine 520 can perform control such that the remote processing request from at least one of the second virtual machine or the third virtual machine 530 and 540 is transmitted to the second signal processing device 170b and the third signal processing device 170c, can receive image data processed by the second signal processing device 170b and the third signal processing device 170c in response to the remote processing request, and can control at least one of the first display 180a or the second display 180b to display an image related to the received image data.

Consequently, images divided and processed by the plurality of signal processing devices 170 and 170b in the vehicle can be displayed.

In some implementations, the first virtual machine 520 can sort image data to be processed by each of the second signal processing device 170b and the third signal processing device 170c in consideration of load balancing or resource balancing of each of the second signal processing device 170b and the third signal processing device 170c, and can transmit the sorted image data to be processed to each of the second signal processing device 170b and the third signal processing device 170c. Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources.

In some implementations, the distributed processing module 598 can be executed separately in the signal processing device 170. In addition or alternatively, the function of the distributed processing module 598 can be executed in the first virtual machine 520.

For example, a first virtual machine 520 can sort image data to be processed by the plurality of virtual machines 530b and 540b in consideration of load balancing or resource balancing of the second signal processing device 170b and the third signal processing device 170c, and can transmit the sorted image data to be processed to each of the plurality of virtual machines 530b and 540b.

Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources.

In some implementations, the first virtual machine can receive image data processed by each of the second signal processing device 170b and the third signal processing device 170c, and can control at least one of the first display 180a or the second display 180b to display an image related to the received image data. Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources.

In some implementations, the first virtual machine 520 can be configured to transmit remote processing request to the server virtual machine 520b executed in each of the second signal processing device 170b and the third signal processing device 170c, the server virtual machine 520b in the second signal processing device 170b can be configured to process image data by the guest virtual machines 530b and 540b in the second signal processing device 170b in response to the remote processing request and can transmit the processed image data to the first virtual machine 520, the server virtual machine 520b in the third signal processing device 170c can be configured to process image data by the guest virtual machines 530c and 540c in the third signal processing device 170c in response to the remote processing request and can transmit the processed image data to the first virtual machine 520, and the first virtual machine 520 can receive the image data processed by each of the second signal processing device 170b and the third signal processing device 170c and can control at least one of the first display 180a or the second display 180b to display an image related to the received image data. This will be described with reference to FIG. 8.

FIGS. 8 to 14 are diagrams referred to in the description of FIG. 7.

Figure 8:
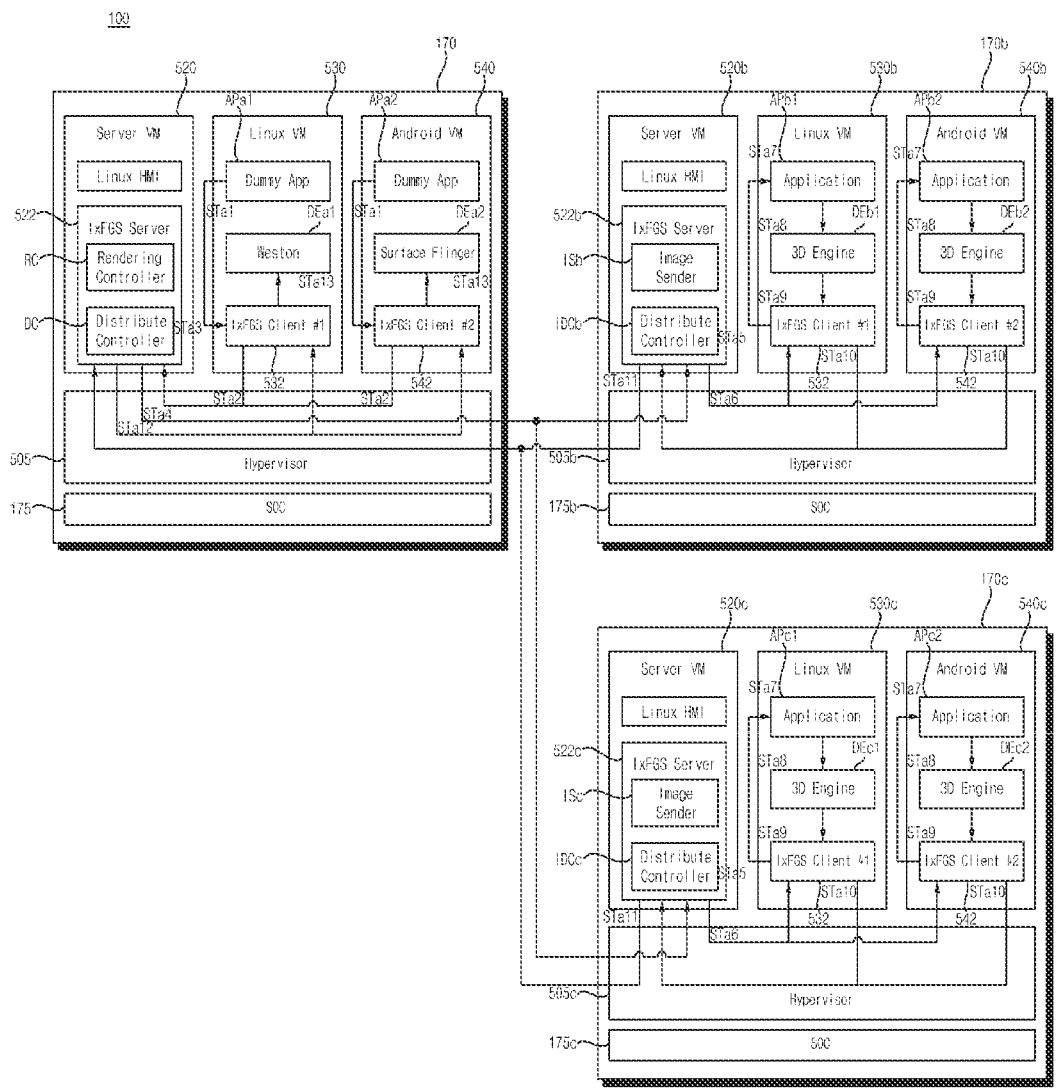

First, FIG. 8 is a diagram illustrating another example of the system executed in the display apparatus for vehicles.

Referring to FIG. 8, a display apparatus 100 for vehicles can include a signal processing device 170 including a processor 175 configured to perform signal processing for a first display 180a and a second display 180b, a second signal processing device 170b including a second processor 175b configured to perform signal processing for a third display 180c, and a third signal processing device 170c including a third processor 175c configured to perform signal processing for a fourth display 180d.

The processor 175 in the signal processing device 170 can execute a first virtual machine 520, which is a server virtual machine, and second and third virtual machines 530 and 540, which are guest virtual machines, on a hypervisor 505 in the processor 175.

The second processor 175b in the second signal processing device 170b can execute a server virtual machine 510b and guest virtual machines 530b and 540b on a hypervisor 505b in the second processor 175b.

The third processor 175c in the third signal processing device 170c can execute server virtual machine 510c and guest virtual machines 530c and 540c on a hypervisor 505c in the third processor 175c.

As depicted in FIG. 8, dummy applications Apa1 and Apa2 can be executed in the second and third virtual machines 530 and 540, respectively.

First, in response to the dummy applications Apa1 and Apa2 being executed (STa1), the second and third virtual machines 530 and 540 can transmit a remote processing request to the first virtual machine 520 (STa2).

Specifically, input and output client interfaces 532 and 542 in the second and third virtual machines 530 and 540 can transmit the remote processing request to an input and output server interface 522 in the first virtual machine 520.

In some implementations, the input and output server interface 522 in the first virtual machine 520 can include a rendering controller RC configured to perform rendering control and a distribute controller DC configured to perform distributed control.

In some implementations, the first virtual machine 520 receives load information or resource information of each of the second signal processing device 170b and the third signal processing device 170c.

Subsequently, the distribute controller DC in the input and output server interface 522 in the first virtual machine 520 can receive the remote processing request (STa3).

The input and output server interface 522 in the first virtual machine 520 can sort image data to be processed by the second signal processing device 170b and the third signal processing device 170c in consideration of load balancing or resource balancing of each of the second signal processing device 170b and the third signal processing device 170c, based on load information or resource information thereof, and can create a request message including content about the sorted image data to be processed.

The input and output server interface 522 in the first virtual machine 520 can transmit the request message to the second signal processing device 170b and the third signal processing device 170c (STa4).

The server virtual machines 520b and 520c in the second signal processing device 170b and the third signal processing device 170c can include input and output server interfaces 522b and 522c, respectively.

The input and output server interfaces 522b and 522c in the second signal processing device 170b and the third signal processing device 170c can receive the request message, and can distribute the request message so as to be processed by the guest virtual machines 530b, 540b, 530c, and 540c (STa5).

Subsequently, the input and output server interfaces 522b and 522c in the second signal processing device 170b and the third signal processing device 170c can receive divided request messages, and can transmit the divided request messages to the guest virtual machines 530b, 540b, 530c, and 540c (STa6).

Applications APb1, APb2, APc1, and APc2 in the guest virtual machines 530b, 540b, 530c, and 540c can receive and process the request message (STa7).

Specifically, input and output client interfaces 532b, 542b, 532c, and 542c in the guest virtual machines 530b, 540b, 530c, and 540c can receive the request message, and can transmit the request message to the applications APb1, APb2, APc1, and APc2, respectively.

The applications APb1, APb2, APc1, and APc2 can receive and process the request message.

Image processing engines DEb1, DEb2, DEc1, and DEc2 in the guest virtual machines 530b, 540b, 530c, and 540c can process image data based on the received request message (STa8).

For example, the image processing engines DEb1, DEb2, DEc1, and DEc2 in the guest virtual machines 530b, 540b, 530c, and 540c perform image rendering based on the received request message. In some implementations, an image object can be rendered.

Subsequently, the input and output client interfaces 532b, 542b, 532c, and 542c in the guest virtual machines 530b, 540b, 530c, and 540c can receive the processed image data, and can transmit the processed image data to the input and output server interfaces 522b and 522c (STa9).

Subsequently, the input and output server interfaces 522b and 522c in the second signal processing device 170b and the third signal processing device 170c can transmit the processed image data to the input and output server interface 522 in the first virtual machine 520 in the signal processing device 170 (STa10).

The input and output server interface 522 in the first virtual machine 520 can be configured to transmit the received processed image data to the second and third virtual machines 530 and 540 (STa10).

Consequently, the input and output client interfaces 532 and 542 in the second and third virtual machines 530 and 540 can receive the processed image data, and can transmit the processed image data to applications DEa1 and DEa2 that are executed.

The applications DEa1 and DEa2 that are executed in the second and third virtual machines 530 and 540 can be configured to display a related image using the processed image data (STa11).

For example, the second virtual machine 530 and the third virtual machine 540 can be configured to combine the received image data with self-processed image data, and can control displays 180a and 180c, respectively, to display composite images related to the combined image data.

Consequently, images divided and processed by the plurality of signal processing devices 170, 170b, and 170c in the vehicle can be displayed. In addition, the plurality of signal processing devices 170, 170b, and 170c for the plurality of displays 180a to 180d in the vehicle can efficiently manage loads or resources.

In some implementations, the guest virtual machine in the second signal processing device 170b can store the processed image data in a shared memory 508b, and can transmit buffer index information in the shared memory 508b to the server virtual machine 520b in the second signal processing device 170b. Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources.

In some implementations, the server virtual machine 520b in the second signal processing device 170b can transmit the processed image data to the first virtual machine 520 based on the buffer index information in the shared memory 508b. Consequently, images divided and processed by the plurality of signal processing devices 170 and 170b in the vehicle can be displayed. In addition, the plurality of signal processing devices 170 and 170b for the plurality of displays 180a to 180d in the vehicle can efficiently manage loads or resources. This will be described with reference to FIG. 9 and subsequent figures.

Figure 9:
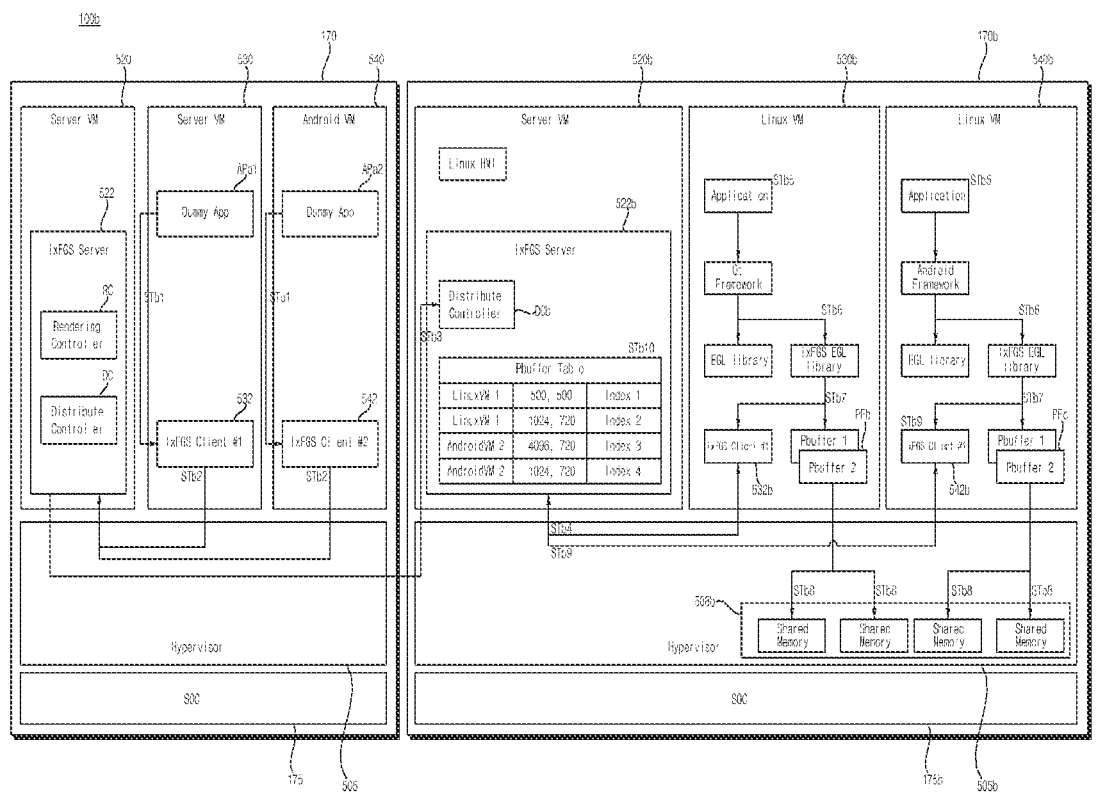

Next, FIG. 9 is a diagram illustrating another example of the system executed in the display apparatus for vehicles. In particular, this figure describes execution of an application in the second signal processing device 170b.

Referring to FIG. 9, a display apparatus 100 for vehicles can include a signal processing device 170 including a processor 175 configured to perform signal processing for a first display 180a and a second display 180b and a second signal processing device 170b including a second processor 175b configured to perform signal processing for a third display 180c.

The processor 175 in the signal processing device 170 can execute a first virtual machine 520, which is a server virtual machine, and second and third virtual machines 530 and 540, which are guest virtual machines, on a hypervisor 505 in the processor 175.

The second processor 175b in the second signal processing device 170b can execute a server virtual machine 510b and guest virtual machines 530b and 540b on a hypervisor 505b in the second processor 175b.

As depicted in FIG. 9, dummy applications Apa1 and Apa2 can be executed in the second and third virtual machines 530 and 540, respectively.

First, in response to the dummy applications Apa1 and Apa2 being executed in the second and third virtual machines 530 and 540, respectively, the dummy applications Apa1 and Apa2 can transmit a remote processing request to input and output client interfaces 532 and 542, respectively, (STb1).

Subsequently, the input and output client interfaces 532 and 542 can transmit the remote processing request to an input and output server interface 522 in the first virtual machine 520 (STb2).

In some implementations, the input and output server interface 522 in the first virtual machine 520 can sort image data to be processed by the second signal processing device 170b in consideration of load balancing or resource balancing of the second signal processing device 170b, based on load information or resource information thereof, and can create a request message including content about the sorted image data to be processed and an application execution request.

Subsequently, the input and output server interface 522 in the first virtual machine 520 can be configured to transmit the request message to a server interface 522b in a server virtual machine 520b in the second signal processing device 170b (STb3).

In particular, the request message can be transmitted to a distribute controller DCb in the input and output server interface 522b.

In some implementations, the request message can include ID information of the first virtual machine and resolution information of image data to be processed.

Subsequently, the server interface 522b in the server virtual machine 520b can register the request message in a buffer table therein, and can transmit the request message so as to be processed by the guest virtual machines 530b and 540b (STb4).

Subsequently, each of the guest virtual machines 530b and 540b in the second signal processing device 170b can execute an application in response to the request message (STb5).

In particular, an application can be executed in response to the application execution request in the request message.

In some implementations, in each of the guest virtual machines 530b and 540b, an application, a frame work, a library, and input and output client interfaces 532b and 542b can be executed.

In some implementations, at the time of creating a surface, each of the guest virtual machines 530b and 540b transmits the request message to an interface-related library (STb6), and creates width and height related to image data to be processed through a buffer (STb7).

Subsequently, each of the guest virtual machines 530b and 540b can map and store information corresponding to the buffer in a shared memory 508b (STb8).

Subsequently, each of the guest virtual machines 530b and 540b can transmit buffer index information and surface information in the shared memory 508b to the server virtual machine 520b (STb9).

In some implementations, the surface information can correspond to the processed image data information.

Subsequently, the server virtual machine 520b can update the buffer table therein based on the received buffer index information and surface information (STb10).

The server virtual machine 520b can transmit information about the updated buffer table, i.e. the processed image data, to the input and output server interface 522 in the first virtual machine 520.

Figure 10:
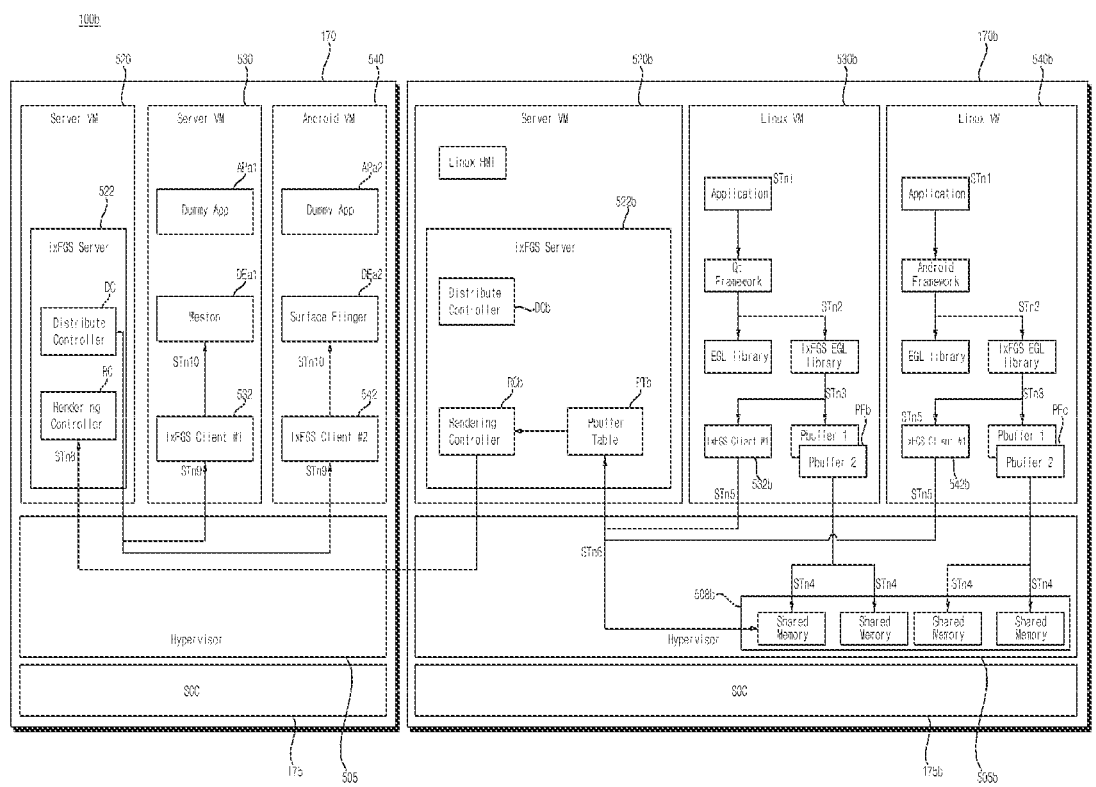

Next, FIG. 10 is a diagram illustrating another example of the system executed in the display apparatus for vehicles. In particular, FIG. 8 describes rendering in the second signal processing device 170b.

Referring to FIG. 8, each of the guest virtual machines 530b and 540b in the second signal processing device 170b can execute an application in response to the request message.

The application in each of the guest virtual machines 530b and 540b in the second signal processing device 170b can render an application frame (STn1).

Subsequently, each of the guest virtual machines 530b and 540b can perform object rendering using the interface-related library (STn2).

Subsequently, each of the guest virtual machines 530b and 540b can write the rendered content in a buffer in each guest virtual machine (STn3).

Subsequently, each of the guest virtual machines 530b and 540b can map and store information corresponding to the buffer in the shared memory 508b (STn4).

Subsequently, each of the guest virtual machines 530b and 540b can transmit buffer index information in the shared memory 508b to the server virtual machine 520b (STn5).

Subsequently, the server virtual machine 520b can receive the processed data from the shared memory 508b based on the received buffer index information (STn6).

Subsequently, the server virtual machine 520b can convert the data from the shared memory 508b into an image, and transmit the processed image data to the input and output server interface 522 in the first virtual machine 520 (STn7).

Subsequently, the rendering controller RC in the first virtual machine 520 can buffer the received image data (STn8).

Subsequently, the input and output server interface 522 in the first virtual machine 520 can be configured to transmit the result of buffering to the input and output client interfaces 532 and 542 in the second and third virtual machines 530 and 540 (STn9).

Subsequently, each of the input and output client interfaces 532 and 542 can transmit the result of buffering to the application that is executed (STn10).

The application that is executed may be configured to display a related image using the image data processed by the second signal processing device 170b corresponding to the result of buffering (STn11).

For example, the second virtual machine 530 and the third virtual machine 540 can be configured to combine the received image data with self-processed image data, and control the displays 180a and 180c, respectively, to display composite images related to the combined image data.

Consequently, images divided and processed by the plurality of signal processing devices 170 and 170b in the vehicle can be displayed. In addition, the plurality of signal processing devices 170 and 170b in the vehicle can efficiently manage loads or resources.

Figure 11:
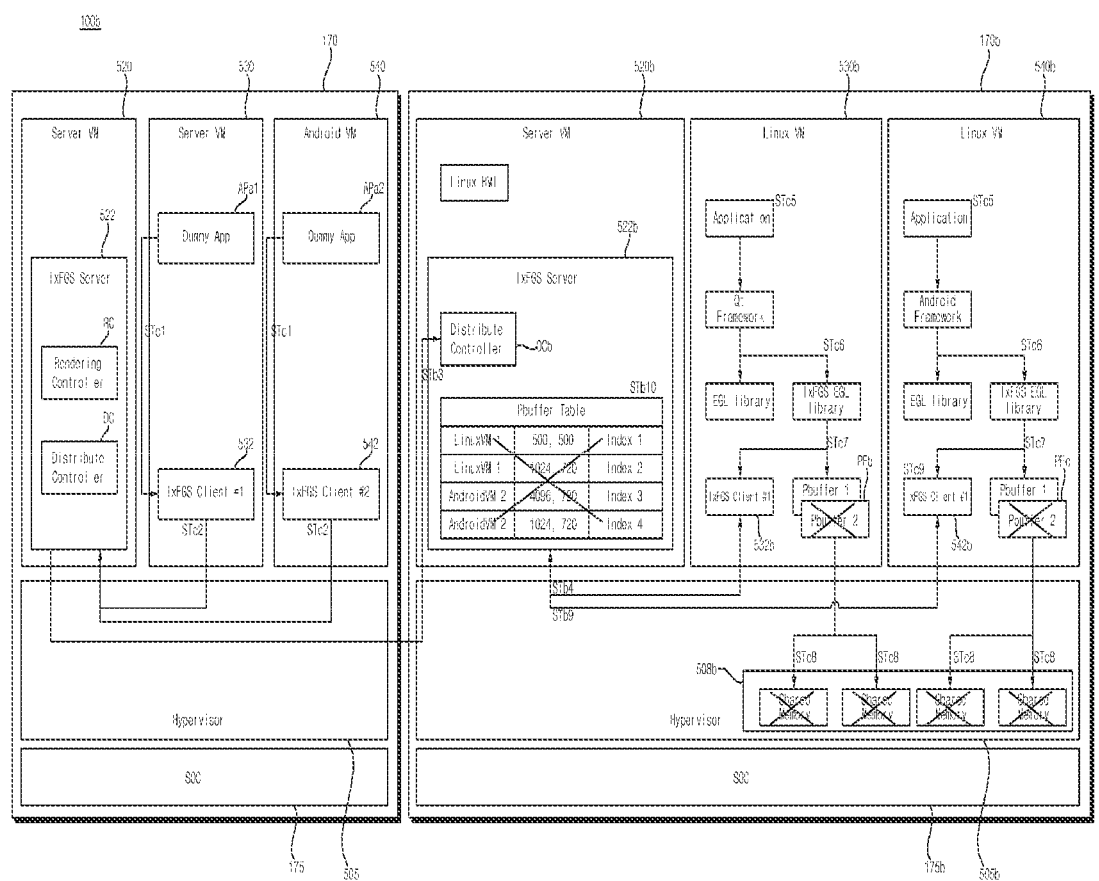

Next, FIG. 11 is a diagram illustrating another example of the system executed in the display apparatus for vehicles. In particular, FIG. 11 describes termination of an application in the second signal processing device 170b.

Referring to FIG. 11, in response to the dummy applications Apa1 and Apa2 being executed in the second and third virtual machines 530 and 540, respectively, the dummy applications Apa1 and Apa2 can transmit a remote processing request to the input and output client interfaces 532 and 542, respectively, (STc1).

Subsequently, the input and output client interfaces 532 and 542 can transmit the remote processing request to the input and output server interface 522 in the first virtual machine 520 (STc2).

Subsequently, the input and output server interface 522 in the first virtual machine 520 can be configured to transmit the request message to the server interface 522b in the server virtual machine 520b in the second signal processing device 170b (STc3).

In particular, the input and output server interface 522 in the first virtual machine 520 can be configured to transmit the request message to the distribute controller DCb in the input and output server interface 522b in the second signal processing device 170b.

In some implementations, the request message can include an application termination request.

Subsequently, the server interface 522b in the server virtual machine 520b in the second signal processing device 170b can divide the request message for the guest virtual machines 530b and 540b that will process the request message, and transmit the request message to the guest virtual machines 530b and 540b (STc4).

Subsequently, upon receiving the request message including the application termination request, each of the guest virtual machines 530b and 540b can terminate the application that is executed (STc5).

Subsequently, at the time of creating a surface, each of the guest virtual machines 530b and 540b can transmit the request message to the interface-related library (STc6), and detect the created buffer (STc7).

Subsequently, each of the guest virtual machines 530b and 540b can also delete the information mapped and stored in the shared memory 508b (STc8).

Subsequently, each of the guest virtual machines 530b and 540b can transmit buffer index information in the shared memory 508b to the server virtual machine 520b (STc9).

Subsequently, the server virtual machine 520b can delete the buffer table therein based on the received buffer index information (STc10).

Consequently, the application executed in the second signal processing device 170b can be terminated.

Figure 12:
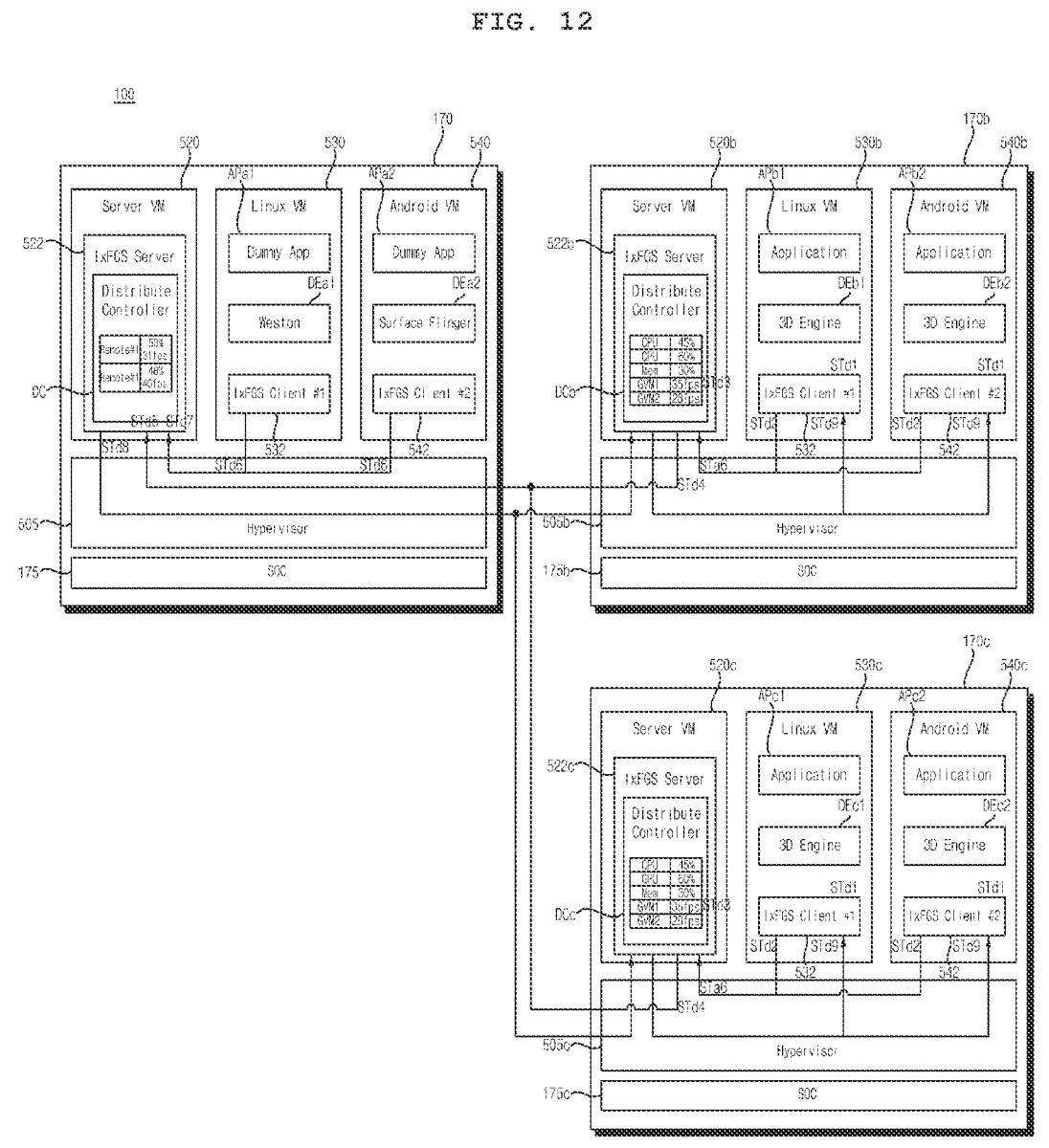

Next, FIG. 12 is a diagram illustrating another example of the system executed in the display apparatus for vehicles. In particular, FIG. 12 describes load balancing.

Referring to FIG. 12, a display apparatus 100 for vehicles can include a signal processing device 170, a second signal processing device 170b, and a third signal processing device 170c.

As depicted in FIG. 12, the second signal processing device 170b and the third signal processing device 170c can process image data through guest virtual machines 530b, 540b, 530c, and 540c.

In some implementations, each of the guest virtual machines 530b, 540b, 530c, and 540c can calculate a rendering frame rate at the time of processing the image data, i.e. at the time of rendering (STd1).

Subsequently, the guest virtual machines 530b, 540b, 530c, and 540c of the second signal processing device 170b and the third signal processing device 170c can transmit the calculated rendering frame rate to server virtual machines 520b and 520c (STd2).

Subsequently, input and output server interfaces 522b and 522c in the server virtual machines 520b and 520c of the second signal processing device 170b and the third signal processing device 170c can calculate loads or resources of each signal processing device (STd3).

For example, the server virtual machines 520b and 520c of the second signal processing device 170b and the third signal processing device 170c can extract and calculate usage of a CPU, a GPU, and a memory in each signal processing device.

Subsequently, the input and output server interfaces 522b and 522c in the server virtual machines 520b and 520c of the second signal processing device 170b and the third signal processing device 170c can transmit load or resource information of each signal processing device to an input and output server interface 522 of a first virtual machine 520 of the signal processing device 170 (STd4).

Subsequently, the first virtual machine 520 of the signal processing device 170 can calculate load balancing or resource balancing of each signal processing device based on the load or resource information of each signal processing device (STd5).

In some implementations, input and output client interfaces 532 and 542 in second and third virtual machines 530 and 540 can transmit a remote processing request to the input and output server interface 522 of the first virtual machine 520 according to execution of dummy applications Apa1 and Apa2 (STd6).

The first virtual machine 520 of the signal processing device 170 can distribute the remote processing request to the second signal processing device 170b and the third signal processing device 170c based on the remote processing request and the calculated load balancing or resource balancing (STd7).

The input and output server interface 522 in the first virtual machine 520 of the signal processing device 170 can transmit the distributed remote processing request to the second signal processing device 170b and the third signal processing device 170c (STd8).

Subsequently, the input and output server interfaces 522b and 522c in the second signal processing device 170b and the third signal processing device 170c can receive a request message, and can distribute the request message so as to be processed by the guest virtual machines 530b, 540b, 530c, and 540c (STd9).

Accordingly, the second signal processing device 170b and the third signal processing device 170c can divide and process image data based on the load balancing or the resource balancing. Consequently, the plurality of signal processing devices 170a, 170b, and 170c can efficiently manage loads or resources.

Figure 13:
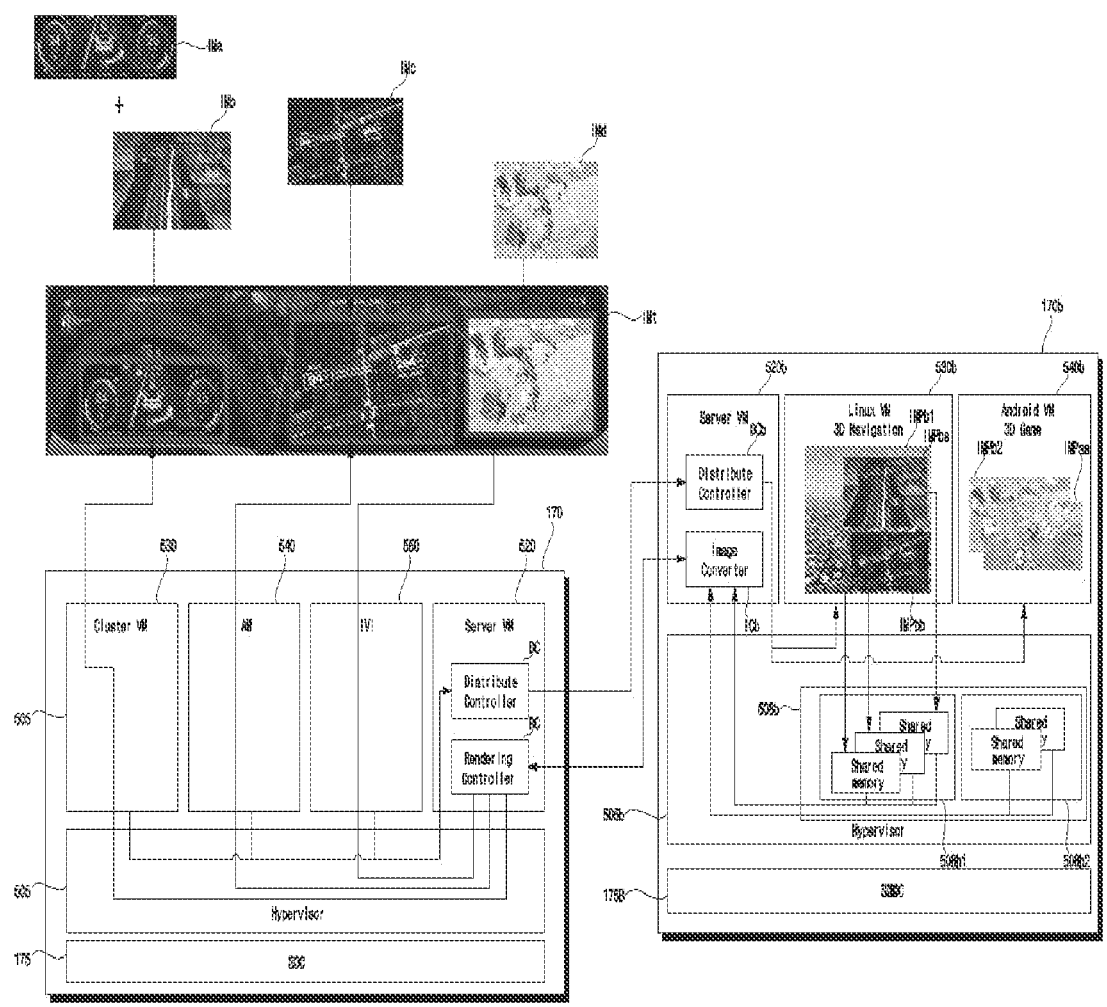

FIG. 13 is a diagram illustrating an example of image display in the display apparatus for vehicles.

Referring to FIG. 13, the display apparatus 100 for vehicles can include a signal processing device 170 and a second signal processing device 170b for image display.

The signal processing device 170 can include a processor 175 configured to execute a first virtual machine 520, which corresponds to a server virtual machine, and second to fourth virtual machines 530 to 550, which correspond to guest virtual machines.

The second virtual machine 530 can perform signal processing for cluster display, the third virtual machine 540 can perform signal processing for AVN or CID display, and the fourth virtual machine 550 can perform signal processing for IVI display.

In some implementations, the first virtual machine 520 can include a rendering controller RC configured to perform rendering control and a distribute controller DC configured to perform distributed control in consideration of loads or resources of guest virtual machines 530b and 540b in the second signal processing device 170b.

The first virtual machine 520 can transmit image data to be divided and processed to a server virtual machine 520b executed in a second processor 175b in the second signal processing device 170b.

A distribute controller DCb in the server virtual machine 520b of the second signal processing device 170b can receive image data to be processed, and can transmit the received image data to the guest virtual machines 530b and 540b in the second signal processing device 170b.

The first guest virtual machine 530b in the second signal processing device 170b can perform image signal processing, and can transmit the processed image data IMPba and IMPbb to the server virtual machine 520b.

In some implementations, the guest virtual machines 530b and 540b in the second signal processing device 170b can process image data IMPb1 by itself, in addition to the image data IMPba and IMPbb processed according to a request.

In some implementations, the second guest virtual machine 540b in the second signal processing device 170b can perform image signal processing, and can transmit the processed image data IMPb2 and IMPaa to the server virtual machine 520b.

The server virtual machine 520b can convert the received image data IMPba and IMPbb and the received image data IMPb2 and IMPaa through an image converter ICb therein.

The server virtual machine 520b can transmit the converted image data to the rendering controller RC in the first virtual machine 520.

The rendering controller RC in the first virtual machine 520 can distribute the received image data IMPba, IMPbb, IMPb2, and IMPaa, and transmit the distributed image data to the second to fourth virtual machines 530 to 550.

The second virtual machine 530 can combine received image data IBb and vehicle driving-related image data IMa with each other, and can control the cluster display to display a composite image related to the combined image data.

In some implementations, the third virtual machine 540 can control the AVN or CID display to display an image related to received image data Imc related to a map.

In some implementations, the fourth virtual machine 550 can control IVI display to display an image related to received image data Imd related to a game.

Consequently, images divided and processed by the plurality of signal processing devices 170 and 170b in the vehicle can be displayed. In addition, the plurality of signal processing devices 170 and 170b in the vehicle can efficiently manage loads or resources.

Figure 14:
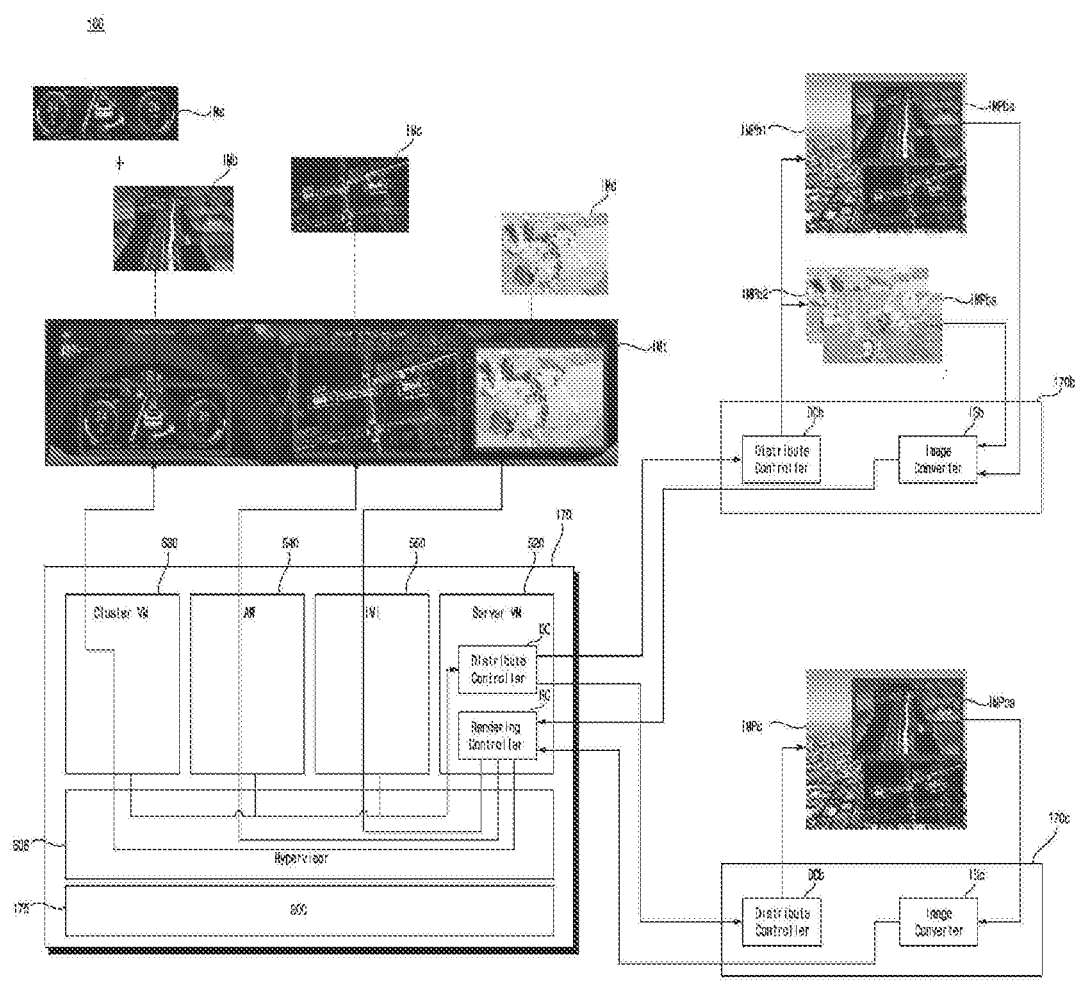

FIG. 14 is a diagram illustrating another example of image display in the display apparatus for vehicles.

Referring to FIG. 14, the display apparatus 100 for vehicles can include a signal processing device 170, a second signal processing device 170b, a third signal processing device 170c for image display.

The operation of the signal processing device 170 can be the same as to the operation of the signal processing device 170 described with reference to FIG. 13, and therefore a description thereof will be omitted.

In some implementations, the second signal processing device 170b can include a distribute controller DCb configured to perform distributed control and an image converter ISb configured to perform image conversion.

In some implementations, the third signal processing device 170c can include a distribute controller DCc configured to perform distributed control and an image converter ISc configured to perform image conversion.

The first virtual machine 520 can transmit image data to be divided and processed to the distribute controller DCb in the second signal processing device 170b.

The distribute controller DCb in the second signal processing device 170b can receive image data to be processed, can perform image signal processing on the received image data in the second signal processing device 170b, and can transmit the processed image data IMPba and IMPbb to the image converter ISb.

The image converter ISb in the second signal processing device 170b can convert the image data IMPba and IMPbb, and can transmit the converted image data to a rendering controller RC in the first virtual machine 520.

In some implementations, the first virtual machine 520 can transmit image data to be divided and processed to a distribute controller DCc in the third signal processing device 170c.

The distribute controller DCc in the third signal processing device 170c can receive image data to be processed, can perform image signal processing on the received image data in the third signal processing device 170c, and can transmit the processed image data IMPca to an image converter ISc.

The image converter ISc in the third signal processing device 170c can convert the image data IMPca, and can transmit the converted image data to the rendering controller RC in the first virtual machine 520.

The rendering controller RC in the first virtual machine 520 can distribute the received image data IMPba, IMPbb, and IMPca, and transmit the distributed image data to the second to fourth virtual machines 530 to 550.

The second virtual machine 530 can combine received image data IBb and vehicle driving-related image data IMa with each other, and can control the cluster display to display a composite image related to the combined image data.

In some implementations, the third virtual machine 540 can control the AVN or CID display to display an image related to received image data Imc related to a map.

In some implementations, the fourth virtual machine 550 can control the IVI display to display an image related to received image data Imd related to a game.

Consequently, images divided and processed by the plurality of signal processing devices 170 and 170b in the vehicle can be displayed. In addition, the plurality of signal processing devices 170 and 170b in the vehicle can efficiently manage loads or resources.

In some implementations, each of the second signal processing device 170b and the third signal processing device 170c depicted in FIG. 14 can be operated as a cartridge.

What is claimed is:

1. A display apparatus for a vehicle, the display apparatus comprising:
   first, second, and third displays configured to be located in the vehicle;
   a first signal processing device comprising a first processor configured to perform signal processing for the first display and the second display; and
   a second signal processing device comprising a second processor configured to perform signal processing for the third display, wherein:
   the first processor is configured to execute first, second, and third virtual machines on a hypervisor in the first processor, and
   the first virtual machine is configured to:
      transmit, from at least one of the second virtual machine or the third virtual machine to the second signal processing device, a remote processing request,
      receive image data processed by the second signal processing device in response to the remote processing request, and
      control at least one of the first display or the second display to display an image related to the received image data,
   wherein the first signal processing device is (i) spaced apart from the second signal processing device and (ii) configured to perform wired communication with the second signal processing device, and
   wherein only the first virtual machine, among the first, second, and third virtual machines, is configured to (i) receive communication data and external input data and (ii) perform signal processing of the communication data and the external input data.

2. The display apparatus of claim 1, wherein:
   the second virtual machine is operated for the first display,
   the third virtual machine is operated for the second display, and
   the first virtual machine is configured to:
      transmit, based on the remote processing request for image processing being received from at least one of the second virtual machine or the third virtual machine, the remote processing request to the second signal processing device,
      receive image data processed by the second signal processing device in response to the remote processing request,
      transmit the received image data to at least one of the second virtual machine or the third virtual machine, and
      control at least one of the first display or the second display to display an image related to the image data.

3. The display apparatus of claim 1, wherein:
   the first virtual machine is configured to transmit the remote processing request to a server virtual machine executed in the second signal processing device,
   the server virtual machine is configured to:
      process, based on the remote processing request, image data in a guest virtual machine executed in the second signal processing device, and
      transmit the processed image data to the first virtual machine, and
   the first virtual machine is configured to:
      receive the image data processed by the second signal processing device, and
      control at least one of the first display or the second display to display an image related to the received image data.

4. The display apparatus of claim 3, wherein the server virtual machine is configured to:
   sort image data based on load balancing or resource balancing of a plurality of guest virtual machines executed in the second signal processing device, and
   transmit the sorted image data to the plurality of guest virtual machines configured to process the image data.

5. The display apparatus of claim 1, wherein the first virtual machine is configured to:
   sort image data based on load balancing or resource balancing of the second signal processing device, and
   transmit the sorted image data to the second signal processing device configured to process the image data.

6. The display apparatus of claim 1, wherein the first signal processing device is configured to:
   execute a distributed processing module configured to sort image data based on load balancing or resource balancing of the second signal processing device, and
   transmit the sorted image data to the second signal processing device configured to process the image data.

7. The display apparatus of claim 1, wherein the image data processed by the second signal processing device comprises a rendering object.

8. The display apparatus of claim 1, wherein an operating system executed in the first signal processing device and an operating system executed in the second signal processing device are different from each other.

9. The display apparatus of claim 1, wherein the first virtual machine is configured to:
   combine image data processed by the first signal processing device and the image data processed by the second signal processing device with each other, and
   control at least one of the first display or the second display to display a composite image related to the combined image data.

10. The display apparatus of claim 1, wherein the first virtual machine is configured to:
    receive and process wheel speed sensor data of the vehicle, and
    transmit the processed wheel speed sensor data to at least one of the second virtual machine, the third virtual machine, or the second signal processing device.

11. The display apparatus of claim 3, wherein the guest virtual machine is configured to:
    store the processed image data in a shared memory, and
    transmit, to the server virtual machine, buffer index information in the shared memory.

12. The display apparatus of claim 11, wherein the server virtual machine is configured to transmit the processed image data to the first virtual machine based on the buffer index information.

13. The display apparatus of claim 1, further comprising:
a fourth display configured to be located in the vehicle; and
a third signal processing device comprising a third processor configured to perform signal processing for the fourth display, wherein:
the first virtual machine is configured to:
transmit the remote processing request from at least one of the second virtual machine or the third virtual machine to the second signal processing device and the third signal processing device,
receive second image data processed by each of the second signal processing device and the third signal processing device in response to the remote processing request, and
control at least one of the first display or the second display to display an image related to the received second image data.

14. The display apparatus of claim 13, wherein:
the first virtual machine is configured to transmit the remote processing request to a server virtual machine executed in each of the second signal processing device and the third signal processing device,
the server virtual machine executed in the second signal processing device is configured to:
process the second image data by executing a guest virtual machine in the second signal processing device based on the remote processing request, and
transmit the processed second image data to the first virtual machine,
the server virtual machine executed in the third signal processing device is configured to:
process the second image data by a guest virtual machine in the third signal processing device in response to the remote processing request, and
transmit the processed second image data to the first virtual machine, and
the first virtual machine is configured to:
receive the second image data processed by each of the second signal processing device and the third signal processing device, and
control at least one of the first display or the second display to display the image related to the received second image data.

15. The display apparatus of claim 13, wherein the first virtual machine is configured to:
sort image data based on load balancing or resource balancing of each of the second signal processing device and the third signal processing device each configured to process the image data, and
transmit the sorted image data to each of the second signal processing device and the third signal processing device.

16. The display apparatus of claim 13, wherein the first signal processing device is configured to:
execute a distributed processing module configured to sort second image data based on load balancing or resource balancing of each of the second signal processing device and the third signal processing device, and
transmit the sorted second image data to each of the second signal processing device and the third signal processing device configured to process the second image data.

17. A display apparatus for a vehicle, the display apparatus comprising:
first, second, third, and fourth displays configured to be located in the vehicle;
a first signal processing device comprising a first processor configured to perform signal processing for the first display and the second display;
a second signal processing device comprising a second processor configured to perform signal processing for the third display; and
a third signal processing device comprising a third processor configured to perform signal processing for the fourth display, wherein:
the first processor is configured to execute first, second, and third virtual machines on a hypervisor in the first processor, and
the first virtual machine is configured to:
sort image data based on load balancing or resource balancing of each of the second signal processing device and the third signal processing device, and
transmit the sorted image data to each of a plurality of guest virtual machines configured to process the sorted image data,
wherein the first signal processing device is (i) spaced apart from the second signal processing device and (ii) configured to perform wired communication with the second signal processing device, and
wherein only the first virtual machine, among the first, second, and third virtual machines, is configured to (i) receive communication data and external input data and (ii) perform signal processing of the communication data and the external input data.

18. The display apparatus of claim 17, wherein the first virtual machine is configured to:
receive the image data processed by each of the second signal processing device and the third signal processing device, and
control at least one of the first display or the second display to display an image related to the received image data.

19. The display apparatus of claim 17, wherein an operating system executed in the first signal processing device and an operating system executed in the second signal processing device are different from each other.

20. The display apparatus of claim 17, wherein the first virtual machine is configured to:
receive and process wheel speed sensor data of the vehicle, and
transmit the processed wheel speed sensor data to at least one of the second virtual machine, the third virtual machine, or the second signal processing device.

* * * * *